US012755552B2

(12) United States Patent
Witriol et al.

(10) Patent No.: US 12,755,552 B2
(45) Date of Patent: Oct. 6, 2026

(54) ROAD CONDITION TAGGING

(71) Applicant: Lytx, Inc., San Diego, CA (US)

(72) Inventors: Daniel Witriol, Kirkland, WA (US); Dennis Cheng, Bellevue, WA (US)

(73) Assignee: Lytx, Inc., San Diego, CA (US)

( * ) Notice: Subject to any disclaimer, the term of this patent is extended or adjusted under 35 U.S.C. 154(b) by 0 days.

(21) Appl. No.: 18/886,584

(22) Filed: Sep. 16, 2024

(65) Prior Publication Data

US 2025/0182491 A1 Jun. 5, 2025

Related U.S. Application Data

(60) Provisional application No. 63/605,214, filed on Dec. 1, 2023.

(51) Int. Cl.

| | |
|---|---|
| ***G06V 20/56*** | (2022.01) |
| ***G01C 21/34*** | (2006.01) |
| ***G06V 10/764*** | (2022.01) |

(52) U.S. Cl.

CPC ......... *G06V 20/56* (2022.01); *G01C 21/3415* (2013.01); *G06V 10/764* (2022.01)

(58) Field of Classification Search

CPC .. G01C 21/3415; G08G 1/012; G08G 1/0112; G08G 1/0129; G08G 1/0133; G08G 1/0141; G08G 1/0145; G08G 1/207; G08G 1/096716; G08G 1/096741; G08G 1/096775; G08G 1/096811; G08G 1/096844; G06V 10/764; G06V 20/56

See application file for complete search history.

(56) References Cited

U.S. PATENT DOCUMENTS

| | | | | |
|---|---|---|---|---|
| 11,493,351 | B2 * | 11/2022 | Hayes | G01C 21/3461 |
| 2016/0063516 | A1 * | 3/2016 | Terrazas | G06V 10/56<br>705/7.29 |
| 2016/0379388 | A1 * | 12/2016 | Rasco | G06Q 10/04<br>715/753 |
| 2018/0099646 | A1 | 4/2018 | Karandikar | |
| 2020/0019161 | A1 * | 1/2020 | Stenneth | B60W 60/0059 |
| 2020/0056892 | A1 | 2/2020 | Haque | |
| 2020/0139976 | A1 * | 5/2020 | Magnusson | G01C 21/3822 |
| 2020/0406897 | A1 * | 12/2020 | Hartmann | G06N 20/00 |
| 2021/0097311 | A1 * | 4/2021 | McBeth | G08G 1/096775 |
| 2022/0019829 | A1 * | 1/2022 | Tal | G06T 5/70 |
| 2022/0020230 | A1 * | 1/2022 | Tal | G06N 3/09 |
| 2022/0092756 | A1 * | 3/2022 | Huang | G06N 3/0464 |

FOREIGN PATENT DOCUMENTS

| | | |
|---|---|---|
| WO | 2024137206 | 6/2024 |

* cited by examiner

*Primary Examiner* — Peet Dhillon
(74) *Attorney, Agent, or Firm* — Van Pelt, Yi & James LLP

(57) ABSTRACT

The present application discloses a method, system, and computer system for determining a road condition classification for one or more road segments. The method includes (i) determining a set of one or more images for a particular geographic area, (ii) obtaining a set of one or more images for the particular geographic area, (iii) determining a set of road classifications for the set of road segments based at least in part on querying a machine learning model to classify the set of one or more images, and (iv) storing the set of road classifications in association with the set of road segments.

25 Claims, 22 Drawing Sheets

300

500

600

900

1000

1300

1400

1500

1600

1700

1800

ROAD CONDITION TAGGING

This application claims priority to U.S. Provisional Patent Application No. 63/605,214 entitled ROAD CONDITION TAGGING filed Dec. 1, 2023 which is incorporated herein by reference for all purposes.

BACKGROUND OF THE INVENTION

Modern transportation vehicles often include vehicle management services in order to support driver safety, operational safety, and operational productivity. Examples of vehicle management services include receiving routing information, vehicle event recorders, providing alerts to vehicle operators such as to inform vehicle operators of expected high risk events, driving guidance (e.g., advanced driver assistance systems (ADAS)), etc. A vehicle event recorder typically includes a set of sensors (e.g., cameras, video recorders, audio recorders, accelerometers, gyroscopes, vehicle state sensors, global positioning system sensors, etc.) that report data that can be analyzed to determine the occurrence of incidents such as high-risk events, process inefficiencies, driver compliance, or anomalous events (e.g., distractions, hard braking, lane changes, pedestrians, rain, accidents, risky maneuvers, unexpected locations, proximity risks, vehicle malfunctions, improper driver behavior, etc.).

A user such as a fleet manager, a dispatcher, driver, or safety coordinator does not currently have a good mechanism to know the current road conditions for the roads along a planned route. In current systems, a user may manually retrieve data from a set of different data sources to inform fleet management decisions. For example, fleet managers currently look at a weather service, manually identify areas in which weather patterns may impact the driving over certain geographic areas, and make fleet management decisions based on the identified areas. Alternatively, the user might see a weather report that indicates that it is snowing in a certain geographic area, but the weather report does not inform the user as to whether the snow is sticking to a particular road or whether the road has been plowed, etc.

BRIEF DESCRIPTION OF THE DRAWINGS

Various embodiments of the invention are disclosed in the following detailed description and the accompanying drawings.

DETAILED DESCRIPTION

Figure 1:
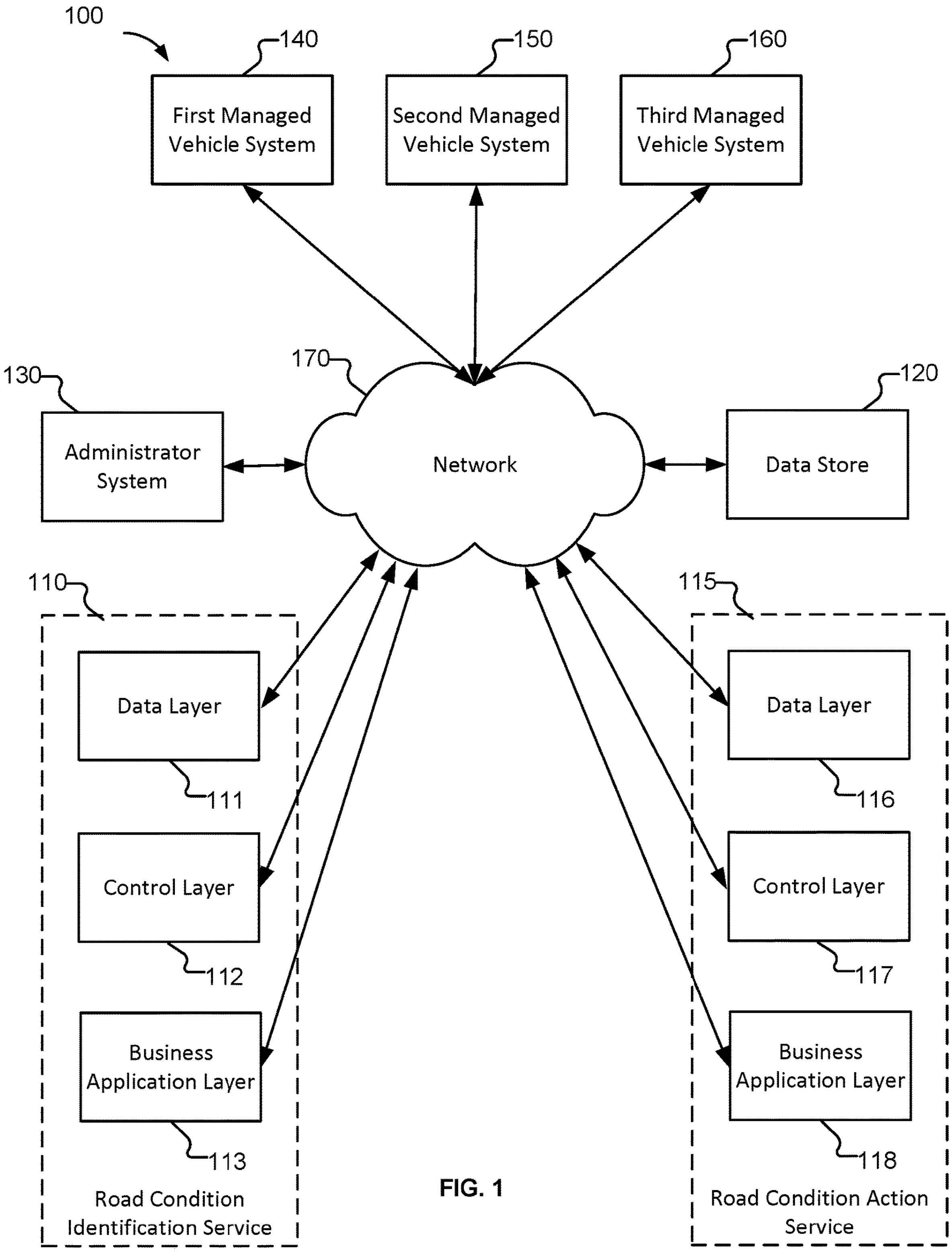
FIG. 1 is a block diagram of a system for providing a road condition identification service and a road condition action service according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a managed vehicle may include a vehicle that is in communication with a fleet management service. As an example, the managed vehicle may send to the fleet management service status information, context information, route information, etc. As another example, the managed vehicle may receive from the fleet management service various hazard information, routing information, etc. A managed vehicle may be a vehicle that is registered with a fleet management service (e.g., to receive a management service such as re-routing, etc.). A managed vehicle may also be referred to herein as a vehicle.

As used herein, a model may include a machine learning model and/or a deep learning model. Examples of machine learning processes that can be implemented in connection with training the model include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, XGBoost, etc. Various other machine learning processes may be implemented.

As used herein, a road condition or road classification may include one or more of (a) a clear road, (b) the presence of snow, (c) a wet surface, (d) occurrence of precipitation, (e) a low visibility (e.g., based on precipitation, fog, etc.), (f) a crash or accident, (g) traffic, (h) a presence of construction, (i) a presence of an object or debris in/on a road, ( ) a presence of a pothole(s), (k) a presence of the road's posted speed limit signage, etc. Various other road conditions or road classifications may be implemented.

Various embodiments store and maintain a geospatial database of road segments that are tagged with one or more road conditions or road classifications. The geospatial database (e.g., the association between road segments and corresponding road conditions) can be used in connection with performing event or driver behavior monitoring. The system may implement active measures in response to a determination that a road segment is associated with a particular road condition or road classification, such as alert the driver or fleet manager (e.g., send a prompt to a client system), re-route the driver (e.g., update a planned route), update a map or visualization of a geographic area (e.g., a particular routing map for a driver, a map used by a dispatcher to monitor the status of a fleet of vehicles, etc.), etc. As used herein, road condition and road classification are used interchangeably.

In some embodiments, the system determines the road condition along a road segment based at least in part on using a machine learning model to classify an image, such as an image captured by a fleet vehicle. The machine learning model can detect the current road segment as having snow, a wet surface, a presence of rain, a low visibility, a crash on the side of the road, a posted speed limit, etc. The machine learning model can be deployed at a server level (e.g., on a cloud service) to provide a server-side classification. Additionally, or alternatively, the machine learning model is deployed at a client system level (e.g., at a vehicle-based client system), such as to provide a vehicle-side classification. The machine learning model deployed at the client system level may be a lighter or smaller model than a model deployed at the server side. For example, the vehicle-side model is trained on fewer features and/or uses fewer features to determine a road classification (e.g., a predicted road condition).

In some embodiments, the system implements the machine learning classification at a client system at the vehicle. For example, the client system is configured to sample (e.g., capture an image, such as a single frame) at a predefined time interval (e.g., every 10 seconds, every minute, etc.) and to classify the sample. The client system stores a machine learning model that is used to classify the sample to determine a road condition. In response to detecting that a road segment has a particular road condition, the client system sends to a server (e.g., a fleet management service) one or more of (i) the sampled image from which the classification is generated and (ii) an indication of the road segment (or the current location of the vehicle) and corresponding road condition. The server can then update the geospatial database in response to receiving the reporting from the client system. In some embodiments, the server aggregates the road condition classification from the client system with road condition classification received from various other client systems or generated by the server, and updates the geospatial database based at least in part on an aggregated road condition.

In some embodiments, the system implements the machine learning classification on a server (or cloud service) that receives sample images from various vehicles within the fleet. The system can query one or more vehicles within a fleet to capture and/or provide a current image (or recent image, such as an image captured within a threshold time period). In response to receiving the image(s) from the vehicle(s), the system performs a classification of the image to detect a road condition(s), if any, at the corresponding road segment. The system can then update a geospatial database, or unified map, or use the road condition in connection with performing another active measure such as to prompt a user (e.g., a fleet manager or driver, etc.), update a planned route for a particular vehicle(s) (e.g., a vehicle expected to travel the road segment within a predetermined/threshold period of time), etc.

In some embodiments, the system receives sample images from various vehicles within the fleet (e.g., from a vehicle event recorder mounted in a fleet vehicle). The system can query one or more vehicles within a fleet to capture and/or provide a current image (or recent image, such as an image captured within a threshold time period). In response to receiving the image(s) from the vehicle(s), the system performs a classification of the image to detect a road condition(s), if any, at the corresponding road segment. The system can then update a geospatial database, or unified map, or use the road condition in connection with performing another active measure such as to prompt a user (e.g., a fleet manager or driver, etc.), update a planned route for a particular vehicle(s) (e.g., a vehicle expected to travel the road segment within a predetermined/threshold period of time), etc.

In some embodiments, the system determines whether to query a vehicle for an image based on data collected from various sources, such as third-party services (e.g., a traffic service, a weather service, a road construction service, etc.). In the case of querying the vehicle based on weather, the system collects data (e.g., weather data, image data, video data, etc.) and determines whether the data at a particular location may give rise to a road condition. For example, in response to determining that the weather data is indicative of a snow storm occurring (or to occur) within a particular region, the system determines the vehicles within the particular region and queries one or more of the vehicles for a current image. In some embodiments, the system selects vehicles to be queried for images based on determining the geospatial intersection between weather data associated with, or related to, a set of road conditions with road segments. The system then determines (e.g., based on current vehicle locations or planned routes) the vehicles on the road segments within the geospatial intersection of the data and queries one or more of the vehicles. The system obtains (e.g., fetches from a vehicle event recorder, obtains from a database storage of vehicle event recorder images, etc.) the images from the selected vehicles and uses a machine learning model to determine the road conditions (e.g., to classify the road segment).

In various embodiments, the system determines road classifications using a vehicle data server (e.g., executed using a vehicle data server processor), using a vehicle event recorder (e.g., executed using a vehicle event recorder processor), or any other appropriate processing device. In the case of the system determining road classifications using a vehicle data server, the system 1) obtains data (e.g., NOAA weather data) comprising a risk for a particular geographic area (e.g., the NOAA data indicates adverse weather information for one or more locations); 2) determines a set of road segments that geospatially intersect with the particular geographic area; 3) obtain a set of one or more images and/or video from the particular geographic area (e.g., fetch from a vehicle event recorder, obtain from a database that has previously been loaded with vehicle event recorder images, etc.); 4) determine a set of road classifications for the set of road segments based at least in part on querying a machine learning model to classify the set of one or more images and/or video; 5) store the set of road classifications in association with the set of road segments. In the case of the system determining road classifications using a vehicle event recorder, the system 1) obtains data (e.g., image or video data from an exterior facing camera, NOAA weather data, etc.) comprising a risk for a particular geographic area (e.g., a model analysis of a images from camera indicates adverse weather information for one or more locations, which may be confirmed using NOAA data); 2) determines a set of road segments that geospatially intersect with the particular geographic area; 3) obtain a set of one or more images and/or video from the particular geographic area (e.g., fetch from a vehicle event recorder, obtain from a database that has previously been loaded with vehicle event recorder images, etc.); 4) determine a set of road classifications for the set of road segments based at least in part on querying a machine learning model to classify the set of one or more images and/or video; 5) store the set of road classifications in association with the set of road segments. In some embodiments, the set of road conditions is supplied to a vehicle data server.

In some embodiments, the system determines and stores a set of road classifications by having a processor configured to: 1) determine a set of one or more images and/or video segments for a particular geographic area; 2) obtain the set of one or more images for the particular geographic area; 3) determine a set of road classifications for a set of road segments associated with the particular geographic area that are based at least in part on querying a machine learning model to classify the set of one or more images and/or video segments; and 4) storing the set of road classifications in association with the set of road segments. In various embodiments, the stored set of road classifications are displayed on a map for a user (e.g., an administrator), the stored set of road classifications trigger an alert that is sent to one or more drivers that are approaching a road classification (e.g., a road hazard, a weather condition, a road condition, a construction zone, a traffic condition, an emergency vehicle condition, a police condition, an ambulance condition, a fire truck condition, a construction equipment condition, etc.), the stored set of road conditions trigger a calculation of a new route for vehicles approaching a road condition, the stored set of road conditions trigger an update of vehicle event recorder parameters (e.g., event trigger levels, sensor sensitivities for detecting events, threshold levels for determining hazardous conditions, etc.), or any other appropriate actions that the road condition(s) may trigger.

In various embodiments, the data comprises data (e.g., video, images, audio, location data, vehicle sensor data, vehicle data, database data, third party data, etc.) appropriate for determining road conditions such as (i) a clear road, (ii) a presence of snow, (iii) a wet surface, (iv) an occurrence of precipitation, (v) a low visibility, (vi) a crash, (vii) traffic, (viii) construction, (ix) a fire on or near the road segment, (x) an emergency service locations, (xi) a tire in road, (xii) an animal in road, (xiii) a pedestrian in road, (xiv) a cyclist in road, (xv) a piece of cargo in the road, (xvi) rough pavement, (xvii) smooth pavement, (xviii) no pavement, (xix) oil slick, (xx) pothole, (xxi) visibility distance, (xxii) glare, (xxiii) lighting condition, (xxiv) precipitation, (xxv) posted speed limits, or any other appropriate road condition.

The system can stream vehicle locations into geospatial database. This stream could be a stream of current locations of vehicles. Additionally, or alternatively, this stream could also include prior locations of vehicles. In some embodiments, the system uses a Virtual Camera/Road View implementation according to which the system divides the country into a grid and stores the exact location and time that a vehicle was in each grid cell. The system can thus ask for images from locations where vehicles used to be and are not limited to where the vehicles are currently. The stream can be a continuous stream of vehicle location data that is stored in the geospatial database. In some embodiments, the recency of vehicle location data is important to ensure that accurate sampling is performed to detect road conditions.

The system can implement a software service to create weather data geometry. For example, the system fetches raster imagery from a weather service such as National Oceanic and Atmospheric Administration (NOAA). The system converts the imagery into vector shapes, which can be represented by a format for encoding geographic data structures such as GeoJSON. The representation of the weather data can be stored in the geospatial database and can be queried in connection with classifying/predicting road conditions for a set of one or more road segments.

In some embodiments, in response to determining (e.g., detecting) that a road segment has one or more predefined road conditions (e.g., snow, wet, low visibility, a crash, etc.), the system determines to periodically re-test the road segment (e.g., to re-sample and re-classify the road condition for the road segment). For example, the system, at a predefined frequency, determines vehicles on the road segment and fetches an image or a road condition classification from one or more of the vehicles on the road segment. The system can continue the re-testing until the detected road condition is no longer present (e.g., in the case of snow, until the snow has melted or has been cleared away). The frequency with which the system re-tests the road segment may be based at least in part on the previous/current predicted road classification.

In some embodiments, the system generates a visualization of road conditions over road segments within a predefined geographic area. For example, the system generates a map that identifies the road conditions along particular segments of roads, highway routes, etc. The system can generate the map based at least in part on the association with road conditions and road segments (e.g., the geospatial database) for road segments within the geographic area.

The system allows users to interact with the visualization. For example, in the case of a map, the user configures a user interface comprising an element via which the user can control to zoom-in or zoom-out the map. As another example, the user is also able to control an element of the map display to select a particular road segment or vehicle to obtain more detailed information that is directed to the road segment or vehicle. As the map is configured to zoom-out, the system can aggregate road classifications (e.g., road conditions) for a set of road segments and represent the aggregated road classification along a longer road segment. As an example, the set of road segments are adjacent road segments from the same road or road segments within a predefined distance from each other.

In some embodiments, the system aggregates road conditions into a parent segment. For example, each road segment may be ten miles in length (or another predefined length). A thirty-mile parent segment may be comprised of three adjacent ten-mile road segments. However, when attempting to view the map from a relatively zoomed-out mode (e.g., to view a national map of the U.S.), rendering each road segment (e.g., child segment) is computationally intensive and would be difficult for users to ascertain road conditions at a particular location. Accordingly, the system aggregates road conditions for a plurality of road segments (e.g., child segments) into a parent segment that represents a longer length of road, which is rendered in the map.

In some embodiments, the system determines the plurality of child segments to aggregate into a parent segment based on selecting a predefined number of road segments within a geographic zone (e.g., adjacent/contiguous road segments, a continuous length of a road comprising the child segments, etc.).

In some embodiments, the system determines the plurality of child segments to be all child segments within a particular geographic region. For example, the system divides the geographic area over which the road conditions are rendered, and the system determines the child segments within each division (e.g., which are to be aggregated to the parent segment).

In some embodiments, in response to determining the set of child segments to be aggregated to a parent segment, the system determines a most extreme road condition(s) (e.g., according to a predefined ranking of types of road conditions) and assigns/associates such road condition to the parent segment.

In some embodiments, in response to determining the set of child segments to be aggregated to a parent segment, the system determines an average of the road conditions for the child segments (e.g., according to a predefined ranking of types of road conditions) and assigns/associates such road condition to the parent segment.

In some embodiments, road segments are created dynamically and stored in a geospatial database—for example, in the case that construction starts at mile 1.5 on I-10 and ends at mile 2.8, this construction zone does not correspond to any existing road segment, so a new road segment is generated corresponding to the construction zone. As another example, in the cases of traffic and crashes, a new road segment is generated for these road condition zones. These custom road segments would be aggregated into standard segments at higher zoom levels where that extreme level of detail is not necessary.

Various embodiments provide a system, method, and device for determining (e.g., predicting) a road classification (e.g., a road condition). The method includes (a) obtaining data comprising a risk for a particular geographic area, (b) determining a set of road segments that intersect with the particular geographic area, (c) obtaining a set of one or more images for the particular geographic area, (d) determining a set of road classifications for the set of road segments based at least in part on querying a machine learning model to classify the set of one or more images, and (e) storing the set of road classifications in association with the set of road segments.

Various embodiments provide a system, method, and device for determining (e.g., predicting) a road classification (e.g., a road condition). The method includes (a) obtaining vehicle data from one or more vehicles, the vehicle data comprising a current location of a vehicle and an indication of a road classification for the current location, (b) determining a set of road classifications for a set of road segments associated with the one or more vehicles based at least in part on the vehicle data, and (c) storing the set of road classifications in association with the set of road segments.

Various embodiments provide a system, method, and device for determining (e.g., predicting) a road classification (e.g., a road condition). The method includes (a) capturing an image of at least part of a road segment, (b) querying a model for a road classification of the road segment based at least in part on the image, (c) determining whether the road classification satisfies one or more predefined criteria, and (d) in response to determining that the road classification satisfies the one or more predefined criteria, send to a server an indication of the road classification for the road segment.

In some embodiments, the system improves the computer by efficiently processing road classifications and providing an efficient manner for providing a user interface to display road classifications. For example, the user is able to easily and intuitively indicate how and what information related to road classifications is to be displayed. In some embodiments, the system improves the computer by efficiently storing road classifications associated with a map display, so that the system is able to efficiently retrieve and display the road classifications appropriately and in an easy to understand manner.

FIG. 1 is a block diagram of a system for providing a road classification service according to various embodiments of the present application. In some embodiments, system 100 implements at least part of system 200 of FIG. 2. In some embodiments, system 100 implements one or more of processes 1000-1800 of FIGS. 10-18.

In the example illustrated in FIG. 1, system 100 includes road condition identification service 110, road condition action service 115, data store 120, administrator system 130, and systems for one or more managed vehicles such as first managed vehicle system 140, second managed vehicle system 150, and/or third managed vehicle system 160. In some embodiments, road condition identification service 110, road condition action service 115, and data store 120 are integrated (e.g., combined into a layer or a single set of servers). System 100 further includes one or more networks such as network 170 over which administrator system 130 and/or first managed vehicle system 140, second managed vehicle system 150, and/or third managed vehicle system 160 communicates with road condition identification service 110, road condition action service 115, or data store 120. In various embodiments, network 170 includes one or more of a wired network and/or a wireless network such as a cellular network, a wireless local area network (WLAN), or any other appropriate network. System 100 may include various other systems or devices.

In some embodiments, system 100 further includes one or more data sources such as third-party data sources (e.g., traffic information, weather information, map information, etc.) or information provided by government organizations (e.g., road information such as collision rates, speed limits, traffic camera feeds, etc.). Road condition identification service 110 obtains information from the one or more data sources in connection with one or more of (a) determining a road condition (e.g., determining a predicted road condition classification for a particular road segment), (b) determining a set of vehicles from which to obtain/fetch information (e.g., raw data such as images, or processed data such as predicted classifications made at the vehicle side) for determining a road condition classification, and (c) determining a road condition classification, etc. In some embodiments, actions are taken based on a road classification using road condition action service 115—for example, model parameters are adjusted (e.g., model parameters such as safe following distance, maximum speed, etc.) or for another example, alerting drivers to bad conditions like snow or fog ahead and suggesting an alternative route.

In some embodiments, road condition identification service 110 uses MVAI (machine vision artificial intelligence) analysis of images, and optionally other sources of data (e.g. NOAA precipitation data, temperature data, reported construction data, fire data, etc . . . ) to identify road conditions for a road segment. Typically, MVAI serves as validation for any predictions made by other data sources, although the MVAI can operate without any additional data. Once road conditions for a segment are identified, the conditions are tagged onto the road segment and stored in a database (e.g., a geospatial database or a standard relational database). In some embodiments, road condition action service 115 then uses these condition tag data for segments to render a map, alert drivers to hazardous road conditions ahead, adjust vehicle routing, adjust vehicle management trigger parameters like following distance, max speed, etc.

In some embodiments, road condition identification service 110 comprises data layer 111, control layer 112, and business application layer 113. Data layer 111, control layer 112, and/or business application layer 113 can be respectively implemented by one or more servers. In some implementations, data layer 111, control layer 112, and/or business application layer 113 is/are implemented by a same set of one or more servers. In some embodiments, system 100 comprises a plurality of data layers that respectively process data pertaining to various tenants or customers. For example, each data layer can be instantiated and implemented for a different tenant or customer (e.g., each fleet may have its own corresponding tenant). Road condition identification service 110 may implement different instances for different fleets of managed vehicles, etc.

In some embodiments, road condition action service 115 comprises data layer 116, control layer 117, and business application layer 118. Data layer 116, control layer 117, and/or business application layer 118 can be respectively implemented by one or more servers. In some implementations, data layer 116, control layer 117, and/or business application layer 118 is/are implemented by a same set of one or more servers. In some embodiments, system 100 comprises a plurality of data layers that respectively process data pertaining to various tenants or customers. For example, each data layer can be instantiated and implemented for a different tenant or customer (e.g., each fleet may have its own corresponding tenant). Road condition action service 115 may implement different instances for different fleets of managed vehicles, etc.

In some embodiments, system 100 uses control layer 112 and/or control layer 117 to perform various functions pertaining to deployment of a model for ADAS or other driving guidance systems. Examples of functions implemented by control layer 112 and/or control layer 117 include generating a unified map, causing a model to be trained, causing collection of samples with which to update the model, causing the model to be updated, controlling/managing a set of managed vehicles (e.g., a fleet), configuring a user interface to provide a unified map, a planned route, or an alert to a client system, sending/providing a prompt or alert to a client system (e.g., in response to determining that a vehicle is expected to traverse a road segment having a road condition), etc. In some embodiments, control layer 112 and/or control layer 117 manages data layer 111 and/or data layer 116 to train the model, collect the samples (e.g., samples to train or update a model, such as labeled data/images or known road condition classifications, etc.), obtain context data (e.g., map data, weather data, traffic data, construction data, accident data, road data, etc. for a geographic area), obtain information for determining road condition classifications (e.g., raw data provided by a vehicle or processed data provided by a vehicle such as a predicted road condition classification based on the use of a vehicle-side model), etc.

In some embodiments, system 100 uses road condition identification service 110 to monitor the status of managed vehicles, including monitoring whether the managed vehicles are encountering or expected to encounter a particular driving context (e.g., the vehicle is expected to traverse a road segment subject to a particular road condition, such as based on the vehicle being within a threshold period of time or within a threshold proximity to the road segment) and monitoring a current vehicle location. Road condition identification service 110 determines whether a vehicle is encountering or expecting to encounter the driving context based at least in part on unified map data and/or image data (e.g., an image captured at the managed vehicle current location, such as by a camera mounted to the managed vehicle). The unified map data may correspond to a unified map that road condition identification service 110 generates based on a plurality of source data, such as map and road data, weather data (e.g., precipitation data, wind data, etc.), temperature data, traffic data, road closure data, road construction data, parking data (e.g., predefined restricted parking areas, predefined permitted parking areas, and/or predefined exclusion zones), vehicle context data for a set of managed vehicles, etc. The source data may be stored in data store 120 among one or more datasets or may be received via third party data sources/services such as in the form of a data stream (e.g., a weather service, a traffic service, etc.). In some embodiments, road condition identification service 110 queries the one or more third party data sources/services for the source data in connection with generating/updating the map data using road condition action service 115, such as a unified map (e.g., in response to determining that a unified map is to be generated or updated, or in response to determining that an inclement weather assessment is to be performed for one or more managed vehicles). In some embodiments, road condition identification service 110 periodically queries, or receives from, the one or more third party data sources/services for the source data.

In some embodiments, the unified map and/or the source data is stored in a geospatial database, such as in data stores 120. Road condition identification service 110 can be configured to query the geospatial database for application data, such as to obtain map or other data within a particular geographic area in connection with determining road conditions.

In some embodiments, administrator system 130, first managed vehicle system 140, second managed vehicle system 150, and/or third managed vehicle system 160, and/or third-party data sources/services are connected to road condition identification service 110 via a connector, such as an application programming interface (API). Road condition identification service 110 periodically queries the managed vehicle for a sample representing a current driving context of the managed vehicle, such as a current vehicle location, a captured image (e.g., an image captured by a camera mounted to the managed vehicle), a road classification, and/or a timestamp for the current vehicle location or captured image (e.g., date, time, time zone, etc.). The sample may be an image corresponding to a current location of the managed vehicle (e.g., a geographic location at which the image is captured is within a predefined distance threshold of the managed vehicle). For example, road condition identification service 110 queries a managed vehicle to capture an image using a camera mounted to the managed vehicle.

In some embodiments, road condition action service 115 updates the map data (e.g., the unified map) according to a predefined frequency/time interval. The predefined frequency may be configured to ensure that the unified map comprises accurate information that is relevant when determining whether a vehicle is encountering or expected to encounter a driving context (e.g., driving along a particular road or through an intersection). For example, the vehicle location data is obtained every 15 seconds, 30 seconds, 60 seconds, etc. and road condition action service 115 updates the unified map with the vehicle location. As another example, the vehicle location data is obtained every 5 minutes, 10 minutes, 15 minutes, etc. In some embodiments, the unified map is presented to a user, for example, to allow fleet managers to have visibility of the fleet and the status of one or more of the managed vehicles in the fleet. The unified map may include recommended active measures such as displays of recommended alternative routes, a list of preconfigured alerts to be communicated to the managed vehicle(s), an indication of one or more map features for which the model has gaps and samples are to be obtained, etc. In some embodiments, road condition action service 115 provides a unified map, information pertaining to the unified map (e.g., a set of indicators comprised in the unified map), information pertaining to an active measure (e.g., a list of potential/recommended active measures), or an instruction to implement an active measure (e.g., an update to a managed vehicle route), such as in response to data requests. For example, the data requests can be communicated to road condition action service 115 by a client system (e.g., first managed vehicle system 140). In some embodiments, road condition action service 115 receives a data request from administrator system 130 in connection with a fleet manager using road condition action service 115 to manage a fleet, to monitor a status of the fleet, to ensure that vehicles in the fleet are safely routed, etc.

In response to receiving a request for a unified map (e.g., a newly generated unified map, an update to a unified map (e.g., in response to receiving updated data from one or more vehicles), etc.) or to perform a monitoring/assessment of whether a vehicle is safely routed (e.g., whether the vehicle is encountering or expecting to encounter inclement weather), road condition action service 115 obtains the applicable source data from data store 120, a managed vehicle (e.g., first managed vehicle system 140, second managed vehicle system 150, and/or third managed vehicle system 160), and/or a third party service(s)/system(s) and generates/updates the unified map (e.g., by storing an indication that a road segment is associated with, or subject to, a particular road condition). As an example, the request for the unified map may include, or be associated with, a particular geographic area. As another example, the geographic area is determined based on the one or more managed vehicles for which the unified map is to be generated/updated or that are to be managed or monitored to ensure safe routing. Road condition identification service 110 uses the geographic area to obtain the applicable/relevant source data. For example, road condition identification service 110 obtains weather data for the geographic area, traffic data for roads within the geographic area or roads corresponding to a predefined route for a managed vehicle(s), map and road data (e.g., road classifications, road dimensions, number of lanes, posted speed limits, etc.), etc. Road condition action service 115 analyzes the source data to determine locations of a set of managed vehicles, determine whether the managed vehicle(s) are travelling or stopped, determine whether the managed vehicle(s) are safely routed, and determine whether a managed vehicle is encountering or expecting to encounter (e.g., within a threshold period of time) a weather risk (e.g., inclement weather) or certain type(s) of road conditions caused by the weather risk. Road condition action service 115 may generate a unified map in connection with monitoring a fleet or determining whether a managed vehicle is encountering or expecting to encounter (e.g., within a threshold period of time) a driving context or be a candidate for collecting a sample of the driving context.

In response to receiving the source data, road condition action service 115 generates the unified map including generating one or more layers for the unified map. For example, road condition action service 115 annotates a standard geographic/road map with information pertaining to one or more of identified driving conditions (e.g., road conditions), parking conditions or other conditions that may impact a vehicle (e.g., a flood warning, a flood zone, construction, snowy conditions, high-levels of precipitation, etc.), etc. Annotating the standard geographic/road map includes generating indicators for the driving conditions or various other conditions or information and configuring one or more layers to include such indicators. The one or more layers for the unified map may be toggled on/off. When toggled on (e.g., to be displayed), the one or more layers are provided as an overlay to the standard geographic/road map. When toggled off (e.g., to be displayed), the one or more layers are not provided as an overlay to the standard geographic/road map. In various embodiments, the standard geographic/road map is predefined (e.g., stored in data store 120) or a service provider for the geographic standard geographic/road map is predefined.

Road condition identification service 110 uses data layer 111 to obtain the source data to be used in connection with generating/updating a unified map and determining a sampling of data reported by managed vehicles (e.g., data reported periodically or in response to a specific request to collect a sample). As an example, data layer 111 determines one or more parameters or criteria for samples to be collected, such as based on using weather data to identify a geographic area(s) in which a weather risk may present, or other map data (e.g., traffic data) to identify a geographic area(s) in which construction or an accident may be present. In response to determining the parameters/criteria for samples to be obtained, data layer 111 may determine candidate samples from a dataset of samples reported by a set of managed vehicles (e.g., according to a reporting policy) or determine candidate managed vehicles to be queried to collect a sample. For example, data layer 111 determines a set of vehicles within a predetermined proximity of the geographic area(s) or a set of vehicles expected to travel through (or recently travelled through) the geographic area(s) within a threshold period of time. In response to road condition action service 115 determining to generate/update the unified map (e.g., in response to receiving a request from a fleet manager via control layer 117), road condition action service 115 instructs/causes data layer 116 to obtain the applicable source data. Data layer 116 can obtain the applicable source data by querying data store 120, a third-party service/data source, and/or a managed vehicle (e.g., first managed vehicle system 140, second managed vehicle system 150, and/or third managed vehicle system 160). Road condition action service 115 also uses data layer 116 to generate the unified map, such as based on parameters provided by control layer 117 (e.g., parameters that are predefined for a fleet or user or that are received from a fleet manager such as via administrator system 130).

Road condition action service 115 uses control layer 117 to obtain/communicate information, instructions, or requests from/to a fleet manager or managed vehicle, such as via administrator system 130 or first managed vehicle system 140, second managed vehicle system 150, and/or third managed vehicle system 160. For example, control layer 117 configures a user interface based on the unified map (e.g., generated/updated by data layer 116), or other information pertaining to detected road condition, a planned route, a travel advisory based on a detected road condition, etc., and control layer 117 provides the user interface to the fleet manager or a managed vehicle. Control layer 117 can receive from a user a request for a unified map, information pertaining to a fleet, or information pertaining to the road condition, planned route, etc. In response to receiving the request for the unified map, control layer 117 causes the unified map to be generated/updated, such as by data layer 116. Further, control layer 117 may cause the unified map to be generated/updated in response to receiving a request for road condition action service 115 to retrain the model, or in response to determining that the model is not accurately classifying certain driving contexts/driving information types. In response to obtaining the unified map, control layer 117 configures the user interface based on the unified map, such as to include the unified map (or a part thereof) or information obtained from the unified map (e.g., indicators of driving conditions, route information, etc.).

In some embodiments, road condition action service 115 uses control layer 117 to respond to queries for data with respect to a particular managed vehicle or in connection with controlling the processing of various data requests such as generating a unified map, determining whether a vehicle is parked, determining whether a vehicle is encountering or expected to encounter a particular driving context (e.g., one or more particular driving conditions), determining candidate samples or candidate managed vehicles to query for a sample, recommending active measures, implementing active measures, etc. As an example, administrator system 130, first managed vehicle system 140, second managed vehicle system 150, and/or third managed vehicle system 160 use an API to connect to road condition identification service 110 and/or road condition action service 115 and configure one or more settings for obtaining vehicle information (e.g., vehicle status, route, driver, vehicle size, vehicle shape, vehicle type/class, corresponding geographic area, unified map, a frequency according to which a vehicle is to provide its current location, etc.). Control layer 112 and/or control layer 117 receive(s) the configurations, queries, etc. from the API, queries data store 120 for data responsive to the query, or requests data layer 111 and/or data layer 116 to perform a fleet management control (e.g., generate/update a unified map, generate recommended active measures, retrieve a current sample captured by a managed vehicle, determine whether a vehicle is experiencing, or expected to encounter, a particular driving context, etc.), and provides the data to the system or service requesting the data.

According to various embodiments, system 100 comprises data store 120. System 100 uses data store 120 to store one or more datasets comprising data pertaining to a fleet of managed vehicles (e.g., location data, route information, vehicle information, map information, current images, etc.). In some embodiments, data store 120 stores one or more datasets comprising data pertaining to fleet or vehicle configurations, such as predefined permitted parking areas, predefined restricted parking areas, predefined exclusion zones, other parking preferences, routing preferences, predefined restricted routes (e.g., roads, or roads having certain characteristics, along which the vehicle is to not travel, etc.), etc. Data store 120 may further store one or more datasets comprising data pertaining to map and road data, such as the road identifier, posted speed limit, historical average speed limit (either generally or at a predefined time of day/week), flood zone information, construction zone information, road classification (e.g., interstate, state highway, rural road, etc.), road dimensions, an indicator of whether the road is paved, number of lanes, width of the road, geo-coordinates for the road (e.g., the boundaries, center line, etc.), etc.

In some embodiments, data store 120 or data layer 111 or data layer 116 stores one or more models, such as a road condition identification model, etc. As an example, the models are machine learning models.

In some embodiments, road condition action service 115 trains or updates the model based at least in part on performing a sampling process (e.g., an image sampling process) based on selectively determining sample candidates or managed vehicle candidates to be queried and collecting corresponding samples. An image sampling process is used to select images with which to train/update/re-train the road condition identification model. For example, road condition action service 115 uses the image sampling process to select images that are expected to represent a particular driving context (e.g., a road with snow, a road with low visibility, a road with precipitation, a road with a pothole, etc.). In some embodiments, road condition action service 115 trains a model to be deployed at road identification service 110 to perform the classification of road conditions, such as based on weather data and one or more images captured at a particular geographic area or road segment (e.g., the geographic area or road segment being determined based on the weather data). Additionally, or alternatively, road condition action service 115 trains a model (e.g., a light or relatively smaller model) to be deployed at the vehicle-side (or client side), such as locally at first managed vehicle system 140, second managed vehicle system 150, and/or third managed vehicle system 160.

Data store 120 can store datasets for a plurality of tenants or customers serviced by road condition identification service 110 and road condition action service 115. In some embodiments, road condition identification service 110 and road condition action service 115 uses datasets across tenants or customers. For example, road condition identification service 110 queries/retrieves current images from managed vehicles across a plurality of tenants/customers to obtain a current image with respect to a particular location or driving condition (e.g., a particular road condition). The model may be deployed across a plurality of tenants or customers and the service provider collects samples from among the different fleets for the various tenants or customers.

According to various embodiments, system 100 comprises administrator system 130 for use by an administrator such as an administrator of road condition identification service 110 and road condition action service 115 or an administrator or a user associated with data store 120 and/or an instance of road condition identification service 110 and road condition action service 115, such as a fleet manager. For example, administrator system 130 comprises a system for communication, data access, computation, etc. A user uses administrator system 130 to maintain a dataset stored in data store 120, to define and manage applications provided by system 100, to set data management policies, to set routing policies, to set active measure policies, to set current image policies (e.g., retention policies, permissions, etc.), to set sampling policies, to set vehicle reporting policies, to configure the machine learning model or machine learning process used to train/update the road condition identification model, to provide various system configurations or settings, etc. For example, a user uses administrator system 130 to define one or more security policies that are to be enforced (e.g., by road condition identification service 110, data layer 111, and/or control layer 112, or road condition action service 115, data layer 116, and/or control layer 117) with respect to data stored at data store 120. In some embodiments, administrator system 130 communicates with road condition identification service 110 and/or road condition action service 115 via a web-interface (e.g., by using a web browser, etc.). For example, administrator system 130 communicates with road condition identification service 110 and/or road condition action service 115 via a web-browser installed on administrator system 130 (e.g., via a user interface configured by an application running on road condition identification service 110 and/or road condition action service 115). In some embodiments, administrator system 130 communicates with road condition identification service 110 and/or road condition action service 115 via an application or service running on administrator system 130 (e.g., a connector or one or more API's corresponding to road condition identification service 110 and/or road condition action service 115).

According to various embodiments, road condition identification service 110 and road condition action service 115 comprises business application layer 113 and business layer 118, respectively. road condition identification service 110 and road condition action service 115 use business application layer 113 and business layer 118, respectively, to provide an interface via which a user (e.g., using administrator system 130, etc.) may interact with various applications such as a development application for developing a feature or model for analyzing the data stored in the data store 120 (e.g., a feature/model for detecting driving conditions such as lane departure, a feature/model for classifying samples according to various driving contexts or road conditions, a feature/model for generating a unified map, a feature/model for determining active measures, a feature/model for routing vehicles, a feature/model for detecting road and weather conditions, etc.), an application for querying a dataset stored in data store 120, an application for analyzing/manipulating a data entity (e.g., an image, map data, vehicle data, the dataset, etc.), an application to access files stored in a dataset (e.g., a dataset stored in data store 120), etc. Various other applications can be provided by business application layer 113 and business application layer 118. For example, a user queries data layer 111 or data layer 116 by sending a query/request to business application layer 113 or business application layer 118, which interfaces with data layer 111 or data layer 116, respectively, to obtain information responsive to the query (e.g., business application layer 113 or business application layer 118 formats the query according to the applicable syntax and sends the formatted query to data layer 111 or data layer 116). Business application layer 113 or business application layer 118 may query control layer 112 or control layer 117, which in turn queries data layer 111 or data layer 1162. As another example, a user uses an interface provided/configured by business application layer 113 or business application layer 118 to configure (e.g., define) one or more security policies, including configuring access permissions to files, data entities, and/or one or more data management policies.

According to various embodiments, system 100 comprises one or more managed vehicles. The managed vehicles communicate with system 100 (e.g., road condition identification service 110 and/or road condition action service 115) via a managed vehicle system (e.g., first managed vehicle system 140, second managed vehicle system 150, and/or third managed vehicle system 160). The managed vehicles may correspond to a single fleet (e.g., a single tenant/customer), or may correspond to a plurality of fleets. The managed vehicle system is used by a user such as a driver of a managed vehicle to communicate with road condition identification service 110 and/or road condition action service 115 (e.g., business application layer 113 and/or business application layer 118) and/or data stored in data store 120. For example, the managed vehicle system obtains from road condition identification service 110 and/or road condition action service 115 route information, map and road data, parking data, a unified map, alerts of driving or parking conditions, traffic information, weather information, etc. As an example, the managed vehicle system communicates with road condition identification service 110 and/or road condition action service 115 via a web-interface. In some embodiments, the managed vehicle system communicates with road condition identification service 110 and/or road condition action service 115 via an application or service running on a managed vehicle system (e.g., a module such as a connector or API that interfaces with road condition identification service 110 and/or road condition action service 115).

Sampling all managed vehicles (e.g., all vehicles within one or more fleets or tenants) or all managed vehicles within a relatively large geographic area is computationally expensive and not scalable or feasible. Various embodiments use weather data to narrow the sampling process. For example, the system uses the weather data to identify a small geographic area (e.g., an optimal or smallest geographic area necessary) for which data is to be sampled (e.g., vehicles are to be queried or a dataset, such as a geospatial database, which is to be queried). The system determines the geographic area (e.g., the geographic area of interest) based at least in part on using the weather data to determine corresponding geographic areas comprising a weather risk (or that recently experienced a weather risk or is expected to experience a weather risk in the near future).

In other embodiments, the system uses one or more other types of map data to narrow the geographic area for which vehicles or data is to be sampled. For example, the system determines the set of vehicles to be sampled based on current traffic data, such as in response to detecting congestion on a road (e.g., one or more road segments).

In some embodiments, road condition identification service 110 selects a set of managed vehicles (e.g., across one or more fleets or tenants) to sample, or from which to obtain image data or other vehicle information/data, based on the weather data. Road condition identification service 110 can determine one or more geographic areas (or road segments) of interest based at least in part on the weather data and select the set of managed vehicles based on identifying the vehicles that (a) are within the geographic areas, (b) have recently (e.g., within a predefined period of time) travelled through the geographic areas (or road segment(s)), and/or (c) are expected to travel through the geographic area or along road segment(s) within a predefined period of time (e.g., based on the planned route(s) for the vehicle(s)). Road condition identification service 110 determines a geographic area of interest based on determining a geospatial intersection between a geographic area and a weather risk comprised in the weather data. A weather risk can correspond to inclement weather, which can be detected based on a weather map or other advisories or alerts communicated in connection with weather data (e.g., risk of severe thunderstorms, tornado warnings, ice condition advisories, etc.).

In some embodiments, system 100 implements a server-side road classification, such as to determine (e.g., predict) a road condition for a particular road segment. For example, system 100 uses road condition identification service 110 to implement (e.g., query) a machine learning model to classify an image obtained for the road segment for which a road condition is to be predicted. Road condition identification service 110 may determine a plurality of predicted road condition classifications (e.g., based on contemporaneously obtained images from one or more vehicles), and determine an aggregated road condition based on the plurality of predicted road condition classifications. For example, road condition identification service 110 uses the aggregated road condition to determine whether to implement an active measure and/or to determine an active measure to implement.

In some embodiments, system 100 implements a vehicle-side road classification. For example, a vehicle captures an image and determines, based at least in part on the image, a predicted road condition for a road segment corresponding to the image. The vehicle can query a local machine learning model to obtain the predicted road condition. In response to determining that the predicted road condition satisfies/matches one or more criteria, the vehicle can provide an indication of the predicted road condition to road condition identification service 110. As an example, one or more criteria include the predicted road condition matching one or more types of road conditions (e.g., presence of snow, precipitation, debris, traffic, an accident, etc.). The vehicle can provide other information in connection with the indication of the predicted road condition, such as other context data (e.g., the image, a vehicle location, etc.).

In response to road condition identification service 110 receiving a predicted road condition from a vehicle, road condition identification service 110 determines the road condition for a particular condition based least in part on the predicted road condition. For example, road condition identification service 110 uses the received precited road condition from the vehicle in connection with determining an aggregated road classification (e.g., aggregated road condition). The aggregated road condition can be determined based on one or more predefined rules. Examples of the one or more predefined rules include (a) if a number of predicted road conditions predicting that the particular road segment (e.g., received from a plurality of vehicles) is subject to a particular type of road condition received within a predefined period of time exceeds a predefined threshold number of classifications, the system deems the aggregated road condition to be such a particular type of road condition, (b) if a majority of a plurality of predicted road conditions for a particular road segment (e.g., received from a plurality of vehicles) within a predefined period of time corresponds to a particular road condition, the system deems the aggregated road condition is deemed to be such a road condition, etc.

In some embodiments, road condition identification service 110 receives a stream of vehicle data from one or more managed vehicles. The vehicle data can include current vehicle locations and other context data. The received stream of vehicle data can be stored in a database, such as a geospatial database. In some embodiments, on rendering a virtual camera layer of the map, the map is divided into grid squares where the size of the grid squares is based on the zoom level of the map, and only the highest ranked points in each grid square are shown on the map. This biases the display of the map towards large popular roads with bad traffic and weather issues. For a subset of these points images will automatically be fetched. In some embodiments, a user is able to drill into the map to select a manual loading of an image from a vehicle associated with a point on the map in a cell of a grid of the map. In some embodiments, the grid of points is intersected with road segment geometry to identify which points are within each road segment. Then, a number of points are selected from which to fetch images (e.g., 1 point, 2 points, 3 points, 4 points, 5 points, etc.). In some embodiments, two points are selected per road-segment. For those points, if MVAI on both images indicate the same road condition, the road segment is indicated as the road condition determined by the MVAI. In some embodiments, the majority of determinations for the road segment is the determined road condition (e.g., 3 or 4 or 5 of 5 determinations; or 2 or 3 of 3 determinations; etc.). In some embodiments, if there are two (or an even number) of images and the determinations are different and/or there is no majority, more images are fetched from the road segment to determine the road condition. In some cases, a road condition is determined based on only 1 image—for example, if other images aren't available, or if for scale purposes it is determined that too many images are being fetched at one time.

Road condition identification service 110 determines road classifications for a standard set of road segment lengths (e.g., a road segment having a particular length, such as 1 mile, 10 miles, or another predefined value, etc.). The road condition action service 115 can aggregate road segment classifications for custom lengths that are not pre-determined. For example when the road condition action service is controlled to render the unified map in a more zoomed-out configuration, road condition action service 115 can aggregate road classifications for a set of segments so if the largest standard road segment is 10 miles in length, then in a relatively zoomed out configuration, road condition action service 115 can aggregate ten adjacent standard road segments collectively having a length of 100 miles.

In some embodiments, system 100 determines one or more road segments for roads within a geographic area. The road segments may be prestored as metadata for a unified map. As an example, the road segment information is stored in a geospatial database stored in data store 120. The geospatial database can be queried to identify road segments within a particular geographic area, such as a geographic area of interest determined based on weather data or other map data (e.g., traffic data, construction data), etc.

A road segment can be represented using a hierarchical path data structure according to a predefined format. An example of a formatted path can be 5555/2/1, representing (i) Road ID: 5555, (ii) the 2nd road segment for this road, measured from South to North or West to East, and (iii) the 1st road segment contained within the 2nd road segment of the road. Accordingly, if the leaf level segments are 10 miles each and the parent segments are 30 miles each, then this road segment would start 30 miles north from the south end of Road ID 5555 and end 10 miles later. The path representation enables road condition identification service 110 to quickly/easily determine which road segments make up a parent segment by querying the database in the form of "5555/2/*" or the like. Such a representation also makes it easy for road condition condition identification service 110 to find adjacent road segments. The lengths of road segments within each level of the hierarchy can be tuned as needed for the application.

System 100 can define a set of leaf road segments and parent hierarchy and store/import them to a geospatial database. The path for a particular road segment (e.g., the representation of the road segment which is described above) can be used as a unique ID for each road segment to enable road condition identification service 110 to query the geospatial database with respect to the path. Optionally, the system may store a plurality of different geometries that represents each road segment, for example: (i) a polygon which is used for intersecting other shapes and points, and (ii) a line-segment which is used for display purposes because it's smaller and more efficient to render.

According to various embodiments, road condition identification service 110 computes road conditions for a set of road segments (e.g., queries a machine learning model for predicted road classifications), and tags the road segments with the road conditions (e.g., by storing an association of the computed road condition for a particular road segment(s)). Road condition identification service 110 can compute the road conditions and tag the road segments with the road conditions according to various techniques, including a server-side pull/polling technique (e.g., implementing a server-side classification), or a client-side push technique (e.g., implementing vehicle-side classifications).

In the server-side pull/polling technique, system 100 runs the following described process according to a predetermined schedule/frequency or in response to determining that a predefined criteria is satisfied (e.g., an administrator or other user has requested an update to the road classifications or unified map data, or a particular weather condition is identified in current weather data). The predefined schedule or frequency can be different for different types of roads or based on different types of traffic patterns or other historical traffic data for the roads. For example, road condition identification service 110 can process (e.g., compute) road conditions for interstates every hour; process road conditions for primary roads every two hours; and process road conditions for secondary roads every four hours. However, various other schedules or frequencies can be implemented.

In some embodiments, the process for performing the server-side pull/polling technique comprises:

Populating the geospatial database with information for a set of road segments (e.g., importing the road segments to the geospatial database for a predefined geographic area);

Determining whether to clear any road segment tags—for example, to remove any previously associated road conditions. The system can identify previously associated road conditions that are expected to no longer be applicable, such as based on the previous association becoming stale after a predefined period of time. Different types of road conditions can have different predefined periods of time used to determine whether to clear the road condition associations.

Clearing the identified road segment tags.

Obtaining weather data, such as from a stream of weather data or a third-party service.

Obtaining weather geometry data from the weather data and storing the weather geometry data in the geospatial database.

Intersecting the weather geometry data with road segments in the geospatial database. For example, the system identifies weather data of interest, such as weather data matching a predefined criteria. Examples of the predefined criteria include (a) a segment of the weather data matching a type of weather condition such as a type of inclement weather; and (b) a segment of the weather data being associated with a weather advisory such as a strong winds advisory, a tornado warning advisory, a risk of severe thunderstorms advisory, an ice advisory, a snowstorm advisory, etc. In response to identifying the weather data of interest, the system determines the geographic areas (e.g., the geographic areas of interest) that intersect with the weather data of interest. Intersecting the weather geometry data with road segments in the geospatial database may include creating a list of road segments (e.g., the list may be referred to as road_segments_new) within the areas that are receiving weather (e.g., road segments in the geographic area in the weather data of interest). In some implementations, the list of road segments only includes the leaf road segments (e.g., 10 mile road segments), and the corresponding parent road segments are tagged later (e.g., an association of the road condition with the parent road segment is stored when aggregating the leaf road segments, such as when presenting the road conditions on a zoomed-out map).

Obtaining (e.g., retrieving) a list of road segments that are currently marked with a weather tag (e.g., road segments for which road conditions were previously associated). The list of road segments with existing weather tags may be referred to as road_segments_existing. In some embodiments, the list road_segments_existing is filtered to remove road segments that are not to be re-scanned at this cycle. As an illustrative example, the system will re-scan road segments currently tagged to determine if they are still subject to their corresponding road conditions (e.g., covered in snow). This re-scanning of previously tagged road segments is true even if the weather precipitation has moved—for example, because of the delay between a snowfall and the time at which the snow is cleared by plowing or melting. In some embodiments, the frequency with which previously tagged road segments are re-scanned is predetermined. The predetermined frequency may be different for different types of road conditions—for example, road conditions that typically persist for longer periods of time may be scanned less frequently (e.g., under the assumption that the road condition is unlikely to be cleared in the near future) or road conditions that are more extreme (e.g., identified as higher risk or more hazardous) are scanned more frequently. Setting the predefined frequency with which road segments are to be rescanned enables the computational cost to be reduced/optimized.

Determining a union between the newly identified road segments in the geographic area of interest (e.g., road_segmenets_new) and the existing road segments to be re-scanned (e.g., road_segments_existing). The union of the two lists of road segments removes duplicates (e.g., deduplicates) from the list of road segments to be scanned. This list of road segments may be referred to as road_segments_scan and is used to identify the road segments for which map data or other types of data (e.g., image data) are to be obtained in connection with predicting a road condition classification.

Determining a set of vehicles (e.g., managed vehicles across a fleet or a plurality of fleets/tenants) for which map data or other types of data are to be obtained. The system can determine an intersection between the list of road segments to be scanned (e.g., road_segments_scan) and the current vehicle locations stored in the geospatial database. In some embodiments, the system can determine at least part of the set of vehicles by determining vehicles that are expected to travel a road segment in the list of road segments within a predefined period of time, such as based on the planned route for the vehicle. Additionally, or alternatively, the system can determine at least part of the set of vehicles by determining vehicles that recently traveled a road segment in the list of segments (e.g., within a predefined period of time), such as based on the previous route of the vehicle, or previous locations of the vehicle reported to road condition identification service 110. In connection with determining the set of vehicles, the system now stores a list of vehicle identifiers for which data is to be queried either from the vehicles (e.g., to obtain real-time or contemporaneous map data or image data) or from a database storing previously reported map data or image data from the vehicles. The system may additionally store timestamps (e.g., date, time, time zone, etc.) in association with the set of vehicles to identify the specific times for which information for the set of vehicles is to be queried.

The description of a server-side pull/polling technique provided above describes how weather data can be used to identify a set of vehicles, such as to provide a refined/filtered list of relevant vehicles (e.g., vehicles that may have captured information relevant to the current road condition classification). In response to determining the set of vehicles, the server-side pull/polling technique may further comprise iterating over the following process for each listed road segment and each listed vehicle:

Fetching an image captured by a camera or event recorder on the vehicle. The image can be fetched from a database or a unified map, such as in the event that the image was recently reported/provided by the vehicle. Additionally, or alternatively, the system can query the vehicle to capture and provide an image or can query the vehicle for an image stored locally at the vehicle at or around (e.g., within a predefined period of time) a particular timestamp (e.g., date, time, time zone, etc.).

Querying a classifier to determine a predicted road condition based at least in part on the fetched image. The classifier may be a machine learning model. For example, the system provides the image to a machine vision artificial intelligence (AI) service to classify the road condition for the corresponding road segment based at least in part on the fetched image.

Tagging the road segment based at least in part on the predicted road condition. In some embodiments, in response to determining the road condition associated with the fetched image, the system stores the road condition in association with the road segment. In other embodiments, the system aggregates the road condition predicted for the fetched image with predicted road condition classifications generated based on other images for the road segment (e.g., within a predefined period of time) and determines an aggregated road condition with which to tag the road segment. The system may be configured to use multiple data points or road condition classifications to determine the road condition with which to tag the road segment because classifying the road condition based on one image (e.g., the fetched image) or data point may result in a high false positive rate. Additionally or alternatively, the system may be configured to use multiple data points or road condition classifications if the particular road segment is relatively long (e.g., longer than a predefined length) or the road properties transition through the road segment (e.g., a reduction in the number of lanes, the road segment comprises a curve in the road, etc.) because a single data point (e.g., the fetched image) may not be representative of the entire road segment. In some embodiments, the number of matches of a particular type of road condition required to determine to associate the road segment with such type of road condition may be configurable based on one or more factors such as the behavior or accuracy of the machine vision AI service, the length of the road segment, and the probability of the weather condition at that location factoring in weather data, altitude data, and historical data.

In various embodiments, road condition identification service 110 determines a road condition with which to tag a parent road segment based on the road condition classifications for a set of corresponding leaf road segments. The tag/road condition for the parent road segment may be updated by determining children (e.g., the set of leaf road segments corresponding to the parent road segment) using text-based queries on road segment paths, or by determining children by intersecting the geometry of the parent road segment with the geometry of the possible children (e.g., because the children, or set of leaf road segments, are geometrically encapsulated by the parent road segment). As an illustrative example, if the path for the parent road segment is "5555/2" then the children of that parent road segment would be "5555/2/*". Using the path, this can be separated into immediate children (e.g., leaf road segments), as well as all children including grandchildren, great grandchildren, etc. or other descendants.

According to various embodiments, parent road segments are tagged based at least in part on the road conditions of their corresponding children (e.g., the leaf road segments associated with, or comprised in, the parent road segment).

The road condition identification service 110 may enforce one or more rules to resolve conflicting or different road condition classifications among the children road segments. For example, if multiple different road condition tags exist among the children road segments, the system deems the road condition for the parent road segment to be the most severe road condition (e.g., according to a predefined ranking or rating of road conditions) experienced on any of its children. For example, if one child segment has snow, and the rest have rain, it may be safer to tag the parent with snow.

According to various embodiments, the client-side push technique for classifying road conditions is more efficient because it runs the image scanning on the vehicle-side client system rather than the server. The client-side push technique may also allow for detection of events or road conditions that cannot scale from the server-side. Although the client-side push technique may be more efficient, the accuracy of this technique may be lower/diminished compared to the server-side pull/polling technique because a lighter or smaller classifier (e.g., machine learning model) may be deployed on the vehicle-side client system as compared to the machine learning model that can be deployed on a server. Additionally, the vehicle-side classification requires custom code to run on the vehicle-side client system (e.g., the vehicle event recorder), which can make deployment more complicated, harder, and slower. Further, updating the vehicle-side code or model is similarly slower and harder to update.

The client-side push technique may be implemented by a set of vehicles across a fleet of vehicles, a plurality of tenants, or fleets of vehicles. The results of vehicle-side classifications may be aggregated to determine road condition classifications over a geographic area (e.g., for a set of road segments).

In various embodiments, the process for performing the client-side push technique comprises:

- Obtaining (e.g., capturing) image data according to a predefined frequency (e.g., at predefined time intervals) or in response to detecting a predefined event. The image data may be video or still images captured by the vehicle event recorder or other camera mounted to the vehicle.
- Determining a predicted road condition classification at the vehicle-side according to a predefined frequency or in response to detection of a predefined event. The predicted road condition classification can be performed by querying a vehicle-side classifier (e.g., a machine learning model deployed at the vehicle). The vehicle system provides the image to a vehicle-side machine vision artificial intelligence (AI) service to classify the road condition, which can be associated with a location of the vehicle (e.g., the current vehicle location or the vehicle location when the image was captured, etc.). In addition to the road surface conditions described above in connection with weather data, the vehicle-side road condition classification can classify the road conditions based at least in part on the detection of construction, traffic, objects in the roadway (e.g., a tire, an axel, a box, etc.), an animal in the roadway, a vehicle in the emergency lane, emergency vehicles (e.g., police, fire, ambulance, etc.), road signage such as the posted speed limit, and/or a crash.
- Either:
  - In response to detecting a non-clear road condition (e.g., based on the vehicle-side predicted road condition classification), sending, by the vehicle-side client system, an indication of the road condition to the server (e.g., road condition identification service 110). The vehicle may additionally send a corresponding timestamp (e.g., time, date, and time zone associated with the road classification or processed image), vehicle location, and/or vehicle identifier;

or
  - In response to a change in road condition, (e.g., based on the vehicle-side predicted road condition classification), sending, by the vehicle-side client system, an indication of the road condition change to the server (e.g., road condition identification service 110). The vehicle may additionally send a corresponding timestamp (e.g., date, time, and time zone associated with the road classification or processed image), vehicle location, and/or vehicle identifier.
- In response to receiving the indication of the road condition from a vehicle-side client system, updating, by the server (e.g., road condition identification service 110), the road condition for the corresponding road segment. For example, the server updates a tag for the road segment. The server can intersect the location associated with the road condition classification (e.g., the vehicle location received in connection with the indication) with road segments to identify the road segments with which the road condition classification is associated. In some embodiments, the server updates the tag for the road segment based on determining an aggregated road condition based on a plurality of predicted road conditions received from a set of vehicles. For example, in response to receiving the indication of the non-clear road condition, the server may query vehicles in the same road segment (or expected to be in the same road segment within a predefined period time) to see if the other vehicles also report the same road condition. In some implementations, determination of a road condition (e.g., an aggregated road condition) based on a plurality of road condition classifications may be appropriate for road conditions such as snow that impact a broad area but may not be appropriate for road conditions such as an object in the roadway that impact a very small area.

Figure 2:
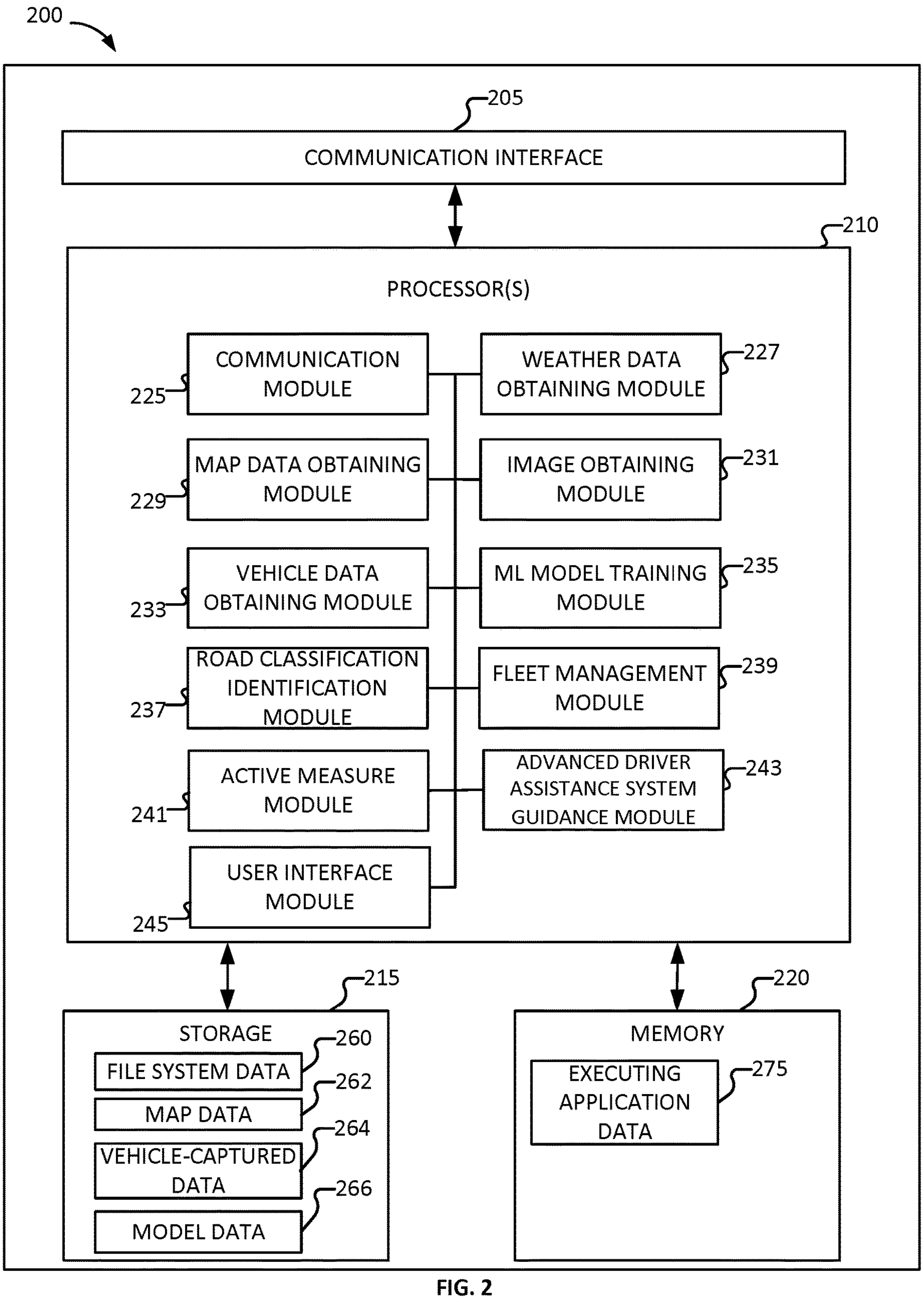
FIG. 2 is a block diagram of a system for determining a road classification for a road segment according to various embodiments of the present application.

FIG. 2 is a block diagram of a system for determining a road classification for a road segment according to various embodiments of the present application. In some embodiments, system 200 implements at least part of system 100 of FIG. 1. In some embodiments, system 200 implements one or more of processes 1000-1800 of FIGS. 10-18.

In the example shown, system 200 implements one or more modules in connection with managing a fleet of managed vehicles, classifying images, determining predicted road conditions, generating a unified map, determining to implement an active measure with respect to a managed vehicle, and recommending or implementing an active measure for a managed vehicle, etc. System 200 comprises communication interface 205, one or more processors 210, storage 215, and/or memory 220. One or more processors 210 comprises, or implements, one or more of communication module 225, weather data obtaining module 227, map data obtaining module 229, image obtaining module 231, vehicle data obtaining module 233, ML model training module 235, road classification identification module 237, fleet management module 239, active measure module 241, advanced driver assistance system guidance module 243, and/or user interface module 245.

In some embodiments, system 200 comprises communication module 225. System 200 uses communication module 225 to communicate with various other systems such as a user system, an administrator system, a managed vehicle system, a data source (e.g., from which files comprising information to be ingested are received, such as a weather service, a traffic service, road data, etc.), and/or a data store (e.g., a distributed data storage system). For example, communication module 225 provides to communication interface 205 information that is to be communicated. As another example, communication interface 205 provides to communication module 225 information received by system 200. Communication module 225 is configured to receive user input to a user system such as a data access request, a request for a unified map, a request for map data (e.g., traffic data, weather data, hazard data, etc.), a request to perform an inclement weather assessment (e.g., to classify an image/data corresponding to a location for a managed vehicle), a request to perform road condition classification (e.g., to predict road conditions along a set of road segments for a vehicle's planned route), a request for recommended active measures (e.g., alternative routes, updated map data, updated estimated time of arrival, etc.), a request for routing information (e.g., an updated route based on detected driving conditions), a security policy, an access policy, a fleet management policy, a routing policy, an active measure policy, a driving condition classification policy, a storage system configuration such as a configuration for a partitioning of data, a selection of an active measure, etc. The user input to the user system can include a query for a file (e.g., a csv file, a library, a module, etc.), a query for a data (e.g., a unified map, traffic data, weather data, hazard data, route data, etc.), a request to set one or more security policies (e.g., a permission with respect to accessing a file), etc. Communication module 225 is configured to provide various user systems or data requesting services with information such as a user interface (e.g., an interface corresponding to a managed vehicle dashboard, a unified map, driving condition information, etc.), information that is responsive to one or more queries or tasks requested to be executed, credentials for accessing data, etc. In some embodiments, communication module 225 communicates data responsive to data requests (e.g., unified map, routing information, current images, etc.).

In some embodiments, system 200 comprises weather data obtaining module 227. System 200 uses weather data obtaining module 227 to obtain weather data, such as from a weather stream or other third-party service. The weather data obtaining module 227 may obtain weather data for a particular geographic area. Alternatively, weather data obtaining module 227 may obtain weather data for a broader geographic area (e.g., a nationwide weather service) and parse the received weather data for a particular geographic area.

In some embodiments, system 200 comprises map data obtaining module 229. System 200 uses map data obtaining module 229 to obtain map data and/or generate a unified map. The map data and/or unified map may be obtained for a predetermined geographic area, such as an area in which a fleet of vehicles often travel, or an area selected based on the map features. For example, in response to identifying one or more gaps in a deployed model, system 200 determines parameters for a set of samples to be obtained to update or improve the model (e.g., improve classification of vehicle contexts, driving environments, driving contexts, etc.) for scenarios (e.g., driving contexts) corresponding to the gap(s). System 200 may use the parameters for the set of samples to be obtained in order to select a geographic area that is expected to comprise driving contexts that may be captured by the managed vehicle(s). System 200 may use map data obtaining module 229 to determine/select the geographic area for which samples are to be obtained.

The unified map comprises various different types of data, such as performance data, local data, and third-party data. The unified map presents the various types of data (e.g., collectively referred to herein as unified map data) in a format that enables fleet managers or drivers of managed vehicles to have integrated information of the fleet and the context of the fleet (e.g., driving conditions or other potential impacts to the fleet safety, etc.). The unified map enables fleet managers or the system to identify areas comprising certain features or contexts, such as hazards and/or dangerous context for vehicles (e.g., vehicles parked as sitting ducks, vehicles parked in areas expected to be impacted by a weather condition, vehicles routed through an area with expected inclement weather, etc.), and to determine locations at which the system samples the managed vehicles or identifies managed vehicles to query for a sample (e.g., based on a determination that the vehicle location data corresponds to the location identified on the unified map, such as a geographic area of interest identified based on a weather risk detected in the weather data). Further, the unified map may comprise an association of current samples, such as images or videos received from managed vehicles within a predefined time threshold (e.g., samples reported within the last minute, 5 minutes, half an hour, etc.), or an ability to retrieve samples in real-time from a managed vehicle in a particular area that allows the system (e.g., automatically by system 200 or manually via an administrator, a fleet manager, or driver) to quickly view and assess the features for certain locations in the geographic area (e.g., to obtain real-time driving conditions), such as roads in an urban core, an intersection, a stop light, a stop sign, a roundabout, high pedestrian traffic areas, areas in which certain weather is expected to be occurring, faded lane markings, faded street signs, traffic state (e.g., heavy traffic, light traffic, collisions, etc.), non-standard street signs (e.g., signs on movable objects such as buses or transport trucks), merging/diverging lanes, toll booths, gates, parking areas, etc. Various other features may be identified or associated with locations in the predetermined geographic area (e.g., in the unified map data). The unified map comprises a plurality of layers that can be toggled on/off to enable the system or fleet managers to make quick assessments of driving contexts being experienced by the managed vehicle(s) or that the managed vehicle(s) are expected to experience (e.g., within a predefined amount of time).

Examples of data comprised in a unified map include map data, road data, traffic data, weather data, precipitation data, temperature data, inclement weather data (e.g., weather advisories), predefined parking data (e.g., data indicating permitted parking areas, restricted parking areas, etc.), hazard data, historical collision data, exclusion data (e.g., data indicating one or more exclusion zones), intersection data, traffic density data, pedestrian density data, road condition classifications, etc. The unified map data may include various other types of data. Unified map data may include information for a particular tenant/customer, or information across various tenants/customers serviced by system 200.

In some embodiments, the unified map comprises feature data correlated with locations on the map. System 200 can use the feature data to identify locations at which a desired driving context is expected to be observed (e.g., a particular driving information type is expected to be collected, a driving condition in a geographic area of interest is expected to be observed). A particular driving context may be associated with one or more features identified in the unified map. System 200 may store a mapping of driving contexts to features, and system 200 uses the mapping to identify features on the unified map at which a driving context (e.g., a particular driving condition) is expected to be observed/occur. As an example, a driving context corresponding to an intersection in an urban core during inclement weather, such as a snowstorm, fog, or rain, may be associated with a combination of features, including: intersection data, urban density data (e.g., boundaries of urban cores or high traffic density areas), and weather data comprising inclement weather (e.g., precipitation levels greater than a threshold precipitation level, etc.) or temperature data. As another example, a driving context corresponding to a curved road during nighttime conditions may be associated with a combination of features, including: road data (e.g., curvature data), time, street lamp data (e.g., location of street lamps that may be indicative of poorly lit locations, etc.), etc.

In some embodiments, system 200 comprises image obtaining module 231. System 200 uses image obtaining module 231 to obtain images from one or more managed vehicles. As an example, one or more managed vehicles may correspond to a fleet of managed vehicles for which the system provides a fleet management service and/or ADAS service (or other driving guidance service). As another example, one or more managed vehicles correspond to a plurality of fleets for a plurality of clients for which the system provides such services. System 200 may train a model for detecting road conditions or other driving guidance services based on data obtained across a plurality of tenants or customers. Each customer may have a certain profile of vehicles and routes for the corresponding managed vehicles and thus a more robust model is trained using information obtained from managed vehicles across a plurality of customers.

In some embodiments, image obtaining module 231 obtains the set of samples based at least in part on one or more of (i) querying a database storing samples and other information communicated by a set of managed vehicles (e.g., according to the predefined reporting policy), and (ii) sending a request to one or more managed vehicles (e.g., specifically request a managed vehicle for an image for one or more driving contexts, etc.). For example, system 200 first queries the dataset of samples to obtain any relevant images and if the dataset does not comprise any relevant samples or returns a number of relevant images less than a predefined sampling number threshold, system 200 requests one or more managed vehicles for images.

System 200 may use image obtaining module 231 to query a managed vehicle to collect (e.g., capture) an image and to provide the image back to system 200 (e.g., a server or cloud service). In response to receiving the query, the managed vehicle may contemporaneously capture an image or otherwise fetch a previously captured image (e.g., an image captured within a predetermined time of the query or within a predetermined distance of the current vehicle location or road segment referenced in the query). Additionally, or alternatively, image obtaining module 231 is configured to receive a stream of images from a set of managed vehicles, and system 200 can store the images in storage 215, such as in vehicle-captured data 264.

In some embodiments, image obtaining module 231 receives an image from a managed vehicle according to a predefined reporting policy or in response to system 200 sending a request to a managed vehicle. For example, image obtaining module 231 manages the predefined reporting policy that defines (i) a frequency with which a managed vehicle is to report information (e.g., images or other vehicle data) to system 200 (e.g., send a sample or other vehicle context information), or (ii) a set of contexts (e.g., vehicle contexts or criteria) which upon satisfaction of the set of contexts, the managed vehicle is to report samples and/or other relevant information (e.g., vehicle context information, map data, etc.). The predefined reporting policy may be configurable, such as by an administrator of system 200 or a customer for which system 200 provides services.

In some embodiments, system 200 uses image obtaining module 231 to obtain images to be used to retrain/update a ML model. For example, in response to determining that a model is to be updated (e.g., by ML model training module 235), image obtaining module 231 is invoked to obtain the relevant samples.

In some embodiments, system 200 determines the set of managed vehicles to query for collected images based at least in part on the weather data and/or map data. For example, the system detects a weather risk (e.g., one or more predefined types of weather events), determines a geographic area expected to be impacted with the weather risk (e.g., based on an intersection between the weather risk geography and the geographic area), and determines images or managed vehicles that can capture images for the associated geographic area (e.g., the geographic area of interest).

In some embodiments, system 200 comprises vehicle data obtaining module 233. System 200 uses vehicle data obtaining module 233 to obtain vehicle data from one or more managed vehicles. System 200 may use vehicle data obtaining module 233 to obtain a stream of vehicle data such as current vehicle location, which can be stored in a geospatial database to identify managed vehicles that system 200 can query for images or for which system 200 can query a database of images to obtain an image for a particular geographic area or road segment. Additionally, or alternatively, system 200 can obtain vehicle data in connection with receiving image data from a managed vehicle, such as in response to system 200 querying the managed vehicle for the image and/or vehicle data.

In some embodiments, vehicle data comprises one or more of: vehicle identifier, vehicle status, route, driver, vehicle size, vehicle shape, vehicle type/class, corresponding geographic area, a unified map, a frequency according to which a vehicle is to provide its current location, a driver identifier, a vehicle-side predicted road condition classification for a particular road segment(s), a location associated with a particular capture image or vehicle-side predicted road condition classification, a timestamp (e.g., date, time, time zone, etc.) associated with a particular capture image or vehicle-side predicted road condition classification, etc.

Managed vehicles have one or more sensors or cameras that capture information pertaining to a vehicle context. Examples of information captured by the sensors or cameras include location data, speed data, state data (e.g., whether the vehicle is in drive, reverse, or parked, etc.), an image of at least part of the environment surrounding the vehicle, a video recording (e.g., a video snippet) of at least part of the environment surrounding the vehicle, etc. The sensors and/or cameras may be continually operated (e.g., when the vehicle is turned on). For example, a managed vehicle is configured to obtain location data (e.g., global positioning system (GPS) data) every 0.5 seconds (e.g., at a frequency of 2 Hz), and the managed vehicle reports the location data to system 200 (e.g., at the same frequency as the vehicle obtains the location data or at a lower frequency). Local storage on a managed vehicle is finite. Because of the storage constraints, the managed vehicle purges older information locally stored in favor of newly captured information. For example, the managed vehicle operates its storage of data captured by sensors and/or cameras according to a first-in, first-out model. In some embodiments, in order for system 200 to obtain relevant samples (e.g., images or other vehicle data) from the managed vehicle(s), system 200 makes timely requests for information from the managed vehicle. In some embodiments, in order for system 200 to obtain relevant samples (e.g., images or other vehicle data) from the managed vehicle(s), system 200 communicates to the managed vehicle(s) a set of parameters for samples to be reported to system 200 (e.g., a set of criteria upon satisfaction of which the managed vehicle captures a sample and sends the sample to system 200).

In some embodiments, system 200 comprises ML model training module 235. System 200 uses ML model training module 235 to train or update a model based at least in part on a training set of samples (e.g., images/videos captured by a managed vehicle, etc.). The model (e.g., a road condition classification model or other identification model) is trained to identify road conditions along a particular road segment, such as to classify the road condition for a road segment into one of a plurality of road conditions. Examples of the types of road conditions into which a road segment can be classified include a clear road condition or a non-clear road condition such as the presence of snow, precipitation, low visibility, debris or other objects blocking the roadway, traffic, construction, low illumination, etc. Various other road conditions may be implemented. The model may be a machine vision AI model that obtains an input image and generates the predicted classification based on the input image.

ML model training module 235 implements a machine learning process to train the model. In some embodiments, a machine learning process using a deep neural network is implemented to train the condition identification model. However, various other machine learning processes may be implemented to obtain the condition identification model. Examples of machine learning processes that can be implemented in connection with training the condition identification model include deep neural network, random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, XGBoost, etc. In some embodiments, the training of the model is a separate process using the same or other system trains, updates, and/or stores the ML model.

As an example, ML model training module 235 trains or re-trains/updates the model using a training set that is determined by identifying samples (e.g., images, videos, etc.) of one or more road conditions classifications (e.g., a clear road, a road with snow, precipitation, low visibility, or other road condition) for which a confidence level of the classification of the image (e.g., by a machine learning model, such as the identification model) exceeds a predefined confidence threshold. If the condition identification model is trained using images selected based on the confidence level, the training set is a higher quality set of images that do not have conflicting classifications.

The model trained by the ML model training module 235 can be implemented at system 200—for example, for server-side classifications on a server or cloud service. Additionally, or alternatively, the model may be deployed to a managed vehicle—for example, for vehicle-side classifications.

In some embodiments, system 200 comprises road classification identification module 237. System 200 uses road classification identification module 237 to identify a road condition classification for a particular road segment. Examples of road condition classifications that may be determined include: (a) a road surface fully covered in snow, (b) a road surface partially covered in snow, (c) a road surface plowed clean (snow on side of road), (d) a road surface that is wet, (e) a road surface comprising standing water (e.g., large puddles or puddles greater than a predetermined size/area), (f) a road having poor visibility (e.g., a visibility less than a predetermined visibility threshold), (g) a road that is obstructed (e.g., a camera blocked, road not visible, etc.), (h) a road surface that is clear, (i) a road surface having a pothole (e.g., a pothole larger than a predetermined size/area), (j) a road surface comprising debris, (k) a road surface comprising construction (e.g., on-going construction, such as with the presence of machinery or construction workers), (l) a road with traffic, (k) a road comprising an accident or other emergency vehicles, (j) road with a posted speed limit sign, etc. Various other road condition classifications may be implemented.

In some embodiments, road classification identification module 237 determines a road condition for a particular road segment based at least in part on querying a machine learning model, such as a model trained by ML model training module 235. Road classification identification module 237 uses raw data, such as images, obtained from managed vehicles in connection with querying the model.

In some embodiments, road classification identification module 237 determines a road condition based on vehicle information obtained from one or more managed vehicles. For example, system 200 receives from a set of managed vehicles a set of predicted road condition classifications for a particular road segment (e.g., a set of vehicle-side classifications) and determines a road condition based at least in part on the set of predicted road condition classifications. Road classification identification module 237 can determine an aggregated road condition for a particular road segment based on aggregating the set of predicted road condition classifications received from the set of managed vehicles.

System 200 uses road classification identification module 237 to determine a road condition for a road segment according to a predefined schedule or frequency, or in response to a particular criteria being satisfied such as detection of an expected weather event based on the weather data. Additionally, in response to classifying a road segment as a non-clear road condition, system 200 can use road classification identification module 237 to determine/update a predicted road condition for the particular road segment according to a different frequency, such as to provide more frequent classifications to determine whether the non-clear road condition has been cleared.

The aggregation of the road classifications for the set of road segments (e.g., to derive the aggregated road classification) can be determined according to a predefined set of aggregation rules. Examples of aggregation rules that can be implemented are: (a) if any of the road segments in the set of road segments indicates a particular road condition (e.g., a non-normal road condition), use the particular road condition as the aggregate road condition, (b) if a plurality of road segments indicate a set of different road conditions, represent the aggregate road condition as the road condition deemed to be worst among the set of different road conditions (e.g., according to a predetermined ranking of road conditions), (c) set the aggregate road condition to the particular road condition for which a majority (or plurality)

of the set of road segments are classified, (d) set the aggregate road condition to be the average of the road conditions among the set of road segments, etc. Various other rules may be implemented to aggregate the road conditions for a set of road segments.

In some embodiments, system 200 comprises active measure module 241. System 200 uses active measure module 241 to determine an active measure to be implemented and to cause the active measure to be implemented. System 200 determines to perform an active measure in response to determining that the road condition for a particular road segment is a non-clear road condition. Active measure module 241 can determine the active measure to be implemented according to a type of road condition detected or associated with a road segment and/or according to a status of one or more managed vehicles (e.g., a detection that a managed vehicle is expected to traverse the impacted road segment within a predetermined period of time, etc.). Examples of active measures that can be implemented include alerting the driver or fleet manager (e.g., sending a prompt to a client system), re-routing the driver (e.g., updating a planned route), updating a map or visualization of a geographic area (e.g., updating a particular routing map for a driver, a map used by a dispatcher to monitor the status of a fleet of vehicles, etc.), updating an estimated time of arrival, sending an alert to a government (e.g., informing governments on where to send resources, such as snow plows, cleanup crews, or first responders), etc. Various other active measures may be implemented—for example, adjusting ADAS parameters such as following distance, safe maximum speed, estimated time of arrival, etc. The re-routing of the driver may be implemented to avoid sending vehicles down dangerous snowy roads, route a vehicle around bad weather, a road closure, or traffic, or improve travel efficiency for the vehicle. The alert provided to the driver can be used to adjust a behavior, such as to inform the driver that a following distance trigger should be longer when the vehicle is travelling over road segments subject to rain or snow, to inform the driver or vehicle that a speed threshold (e.g., a speeding threshold that triggers an alert to the driver at the vehicle client system) is adjusted down over road segments subject to rain or snow, or to suggest safe speeds for a particular vehicle type based on a particular road condition or weather condition type on road segments.

In some embodiments, system 200 comprises advanced driver assistance system guidance module 243. System 200 uses advanced driver assistance system guidance module 243 to implement the model to perform classifications of vehicle contexts. For example, advanced driver assistance system guidance module 243 uses the model to determine whether a vehicle is experiencing lane departure. As another example, advanced driver assistance system guidance module 243 uses the model to determine whether the vehicle performed, or is performing, a rolling stop. As another example, advanced driver assistance system guidance module 243 uses the model to detect potential collisions such as in connection with providing forward collision warning. The advanced driver assistance system guidance module 243 can update triggers to identify speeding or unsafe driving speeds, triggers to identify a safe following distance, etc. The triggers can be updated for a particular road segment based at least in part on detection of a particular road condition over the particular road segment.

In some embodiments, advanced driver assistance system guidance module 243 stores a mapping of vehicle contexts to active measures. For example, advanced driver assistance system guidance module 243 stores an indication of an active measure to be performed in response to determining that a road segment is subject to (e.g., the road segment is tagged with) a particular type of road condition. As another example, advanced driver assistance system guidance module 243 stores an indication of an active measure to be performed in response to determining that the vehicle is experiencing lane departure (e.g., alert the driver, vibrate the steering wheel, automatically control the vehicle to return to the area within the lanes, etc.). As another example, advanced driver assistance system guidance module 243 stores an indication of an active measure to be performed in response to determining that the vehicle performed or is performing a rolling stop, such as to provide an alert to the driver or fleet manager. As another example, advanced driver assistance system guidance module 243 stores an indication of an active measure to be performed in response to determining that a collision is expected to occur, such as to provide forward collision warnings, alert the driver or fleet manager, and/or engage the vehicle brakes.

In some embodiments, system 200 comprises user interface module 245. System 200 uses user interface module 245 to provide a user interface to a user (e.g., via a client system such as for a fleet manager or a driver of a managed vehicle, etc.) via which the user configures, defines, or develops data entities, policies (e.g., vehicle reporting policies, sampling policies, etc.), preferences, models (e.g., driving condition identification models), mappings of vehicle contexts to active measures, etc. In some embodiments, the user interface is configured to provide route data for one or more vehicles or a map (e.g., a unified map or other map that displays road condition classifications over various road segments) over a predefined geographic area. Additionally, or alternatively, the user interface is configured to provide an alert such as a travel advisory (e.g., an advisory that a route intersects with a road segment having a particular road condition classification, an advisory that the estimated time of arrival has changed based on a road condition classification, an indication that the route has been updated, etc.).

According to various embodiments, storage 215 comprises one or more of file system data 260, map data 262, vehicle-captured data 264, and/or model data 266. Storage 215 comprises a shared storage (e.g., a network storage system), database data, and/or user activity data.

In some embodiments, file system data 260 comprises a database such as one or more datasets for data entities (e.g., one or more datasets for one or more features, models, schemas, tables, unified maps, unified map data, configurations for managed vehicles, fleets, drivers, etc.). File system data 260 can store various policies such as a routing policy, a notification policy, an active measure policy, a managed vehicle reporting policy (e.g., to report vehicle contexts, such as speed, location, state, scenarios, etc.), a sampling policy, etc. In some embodiments, file system data 260 comprises the model and samples, such as a training set.

In some embodiments, map data 262 comprises map data, road data, traffic data, weather data, predefined parking data (e.g., data indicating permitted parking areas, restricted parking areas, etc.), hazard data, historical collision data, exclusion data (e.g., data indicating one or more exclusion zones), etc. Map data 262 may include various other types of data. Map data 262 may include information for a particular tenant/customer, or information across various tenants/customers serviced by system 200. In some embodiments, map data 262 comprises road segment tags, such as stored road condition classifications in association with a road segment(s).

In some embodiments, vehicle-captured data 264 comprises vehicle information collected from one or more managed vehicles, such as vehicle identifier, vehicle location, a predicted road condition classification performed locally at the vehicle, etc. In some embodiments, vehicle-captured data 264 receives, stores, and provides vehicle information (e.g., images and/or videos from vehicles). For example, vehicle-captured data 264 comprises a cache for imagery from a vehicle so that if data has been fetched from a vehicle it is stored in a cache for future use (e.g., for processing or for model training, etc.).

In some embodiments, model data 266 comprises one or more machine learning models or other classifiers for generating predicted classifications, such as a model for predicting a road condition based on an image. The model data 266 can comprise a model that is deployed at the server-side (e.g., by a cloud service) and/or a model that is to be deployed at one or more managed vehicles (e.g., to provide vehicle-side predicted road condition classifications).

According to various embodiments, memory 220 comprises executing application data 275. Executing application data 275 comprises data obtained or used in connection with executing an application such as an application executing in connection with managing vehicles, an application executing to assess vehicle travel (e.g., an inclement weather assessment, an assessment of whether the vehicle is expected to encounter a driving condition), an application executing to generate unified maps, an application executing to determine, recommend, or implement active measures, an application that processes and/or responds to queries, an application that generates models for detecting (e.g., predicting) driving conditions or scenarios (e.g., vehicle contexts), etc. Other applications comprise any other appropriate applications (e.g., an index maintenance application, a communications application, a chat application, a web browser application, an image analysis application, a report preparation application, a user interface application, a data analysis application, an anomaly detection application, a user authentication application, a security policy enforcement application, a code analysis application, a code development application, etc.).

Figure 3A:
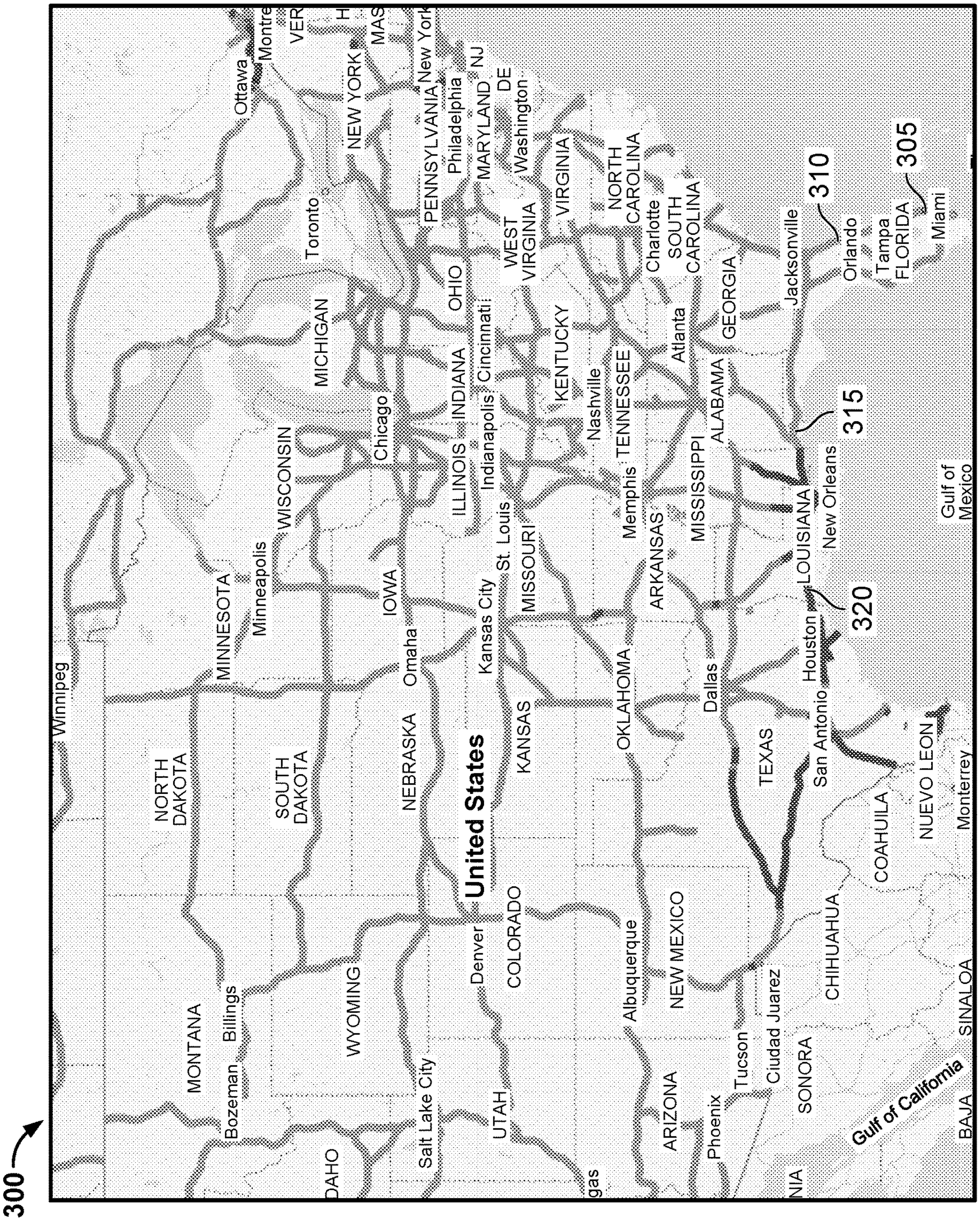
FIG. 3A illustrates an example of a visualization of a road condition on a map according to various embodiments.

FIG. 3A illustrates an example of a visualization of a road condition on a map according to various embodiments. In some embodiments, visualization 300 is generated by the system of FIG. 1 and/or the system of FIG. 2. In the example shown, visualization 300 illustrates a map of part of North America. Visualization 300 can be rendered on a user interface, such as at a client system operated by a fleet manager, etc. Visualization 300 may be configured to illustrate a set of roads over the geographic area. The set of roads provided by visualization 300 can be filtered, such as by selection of a type of class(es) of road(s) to be provided. For example, a fleet manager may select a set of interstate highways to be provided on the map. As another example, the set of roads to be represented on the map may be automatically determined, such as based on current locations or expected routes of a set of one or more vehicles in a fleet of vehicles. In some embodiments, map-based visualization of road conditions is shared with a fleet manager, a safety manager, and/or a driver (e.g., via a mobile application). In some embodiments, a driver can factor in road conditions when planning their route—for example, in bad conditions, the driver can adjust their route, keep the same route but update their estimated time of arrival, and/or wait and see in a safe parking location until conditions improve.

In some embodiments, the system configures visualization 300 to identify portions of the roads (e.g., road segments) that are subject to (e.g., tagged with) a particular road condition. The system may (e.g., based on user input such as from a fleet manager) toggle the types of road conditions to be identified on the map. Visualization 300 may be configured to identify the portions of roads that are subject to a road condition based on an emphatic display of the impacted road segments as compared with road segments not subject to that particular type of road condition. For example, road segments subject to a road condition may be displayed in a first color and road segments not subject to the road condition (e.g., road segments having a clear road condition) are displayed in a second color. Different colors can be utilized for different road conditions. Various other emphatic display techniques may be implemented such as a change in the line width for the road, a bolding of the line for the road based on the associated road condition, a hashing of the line for the road, a dotted line, a flashing line, a changing line width, color, intensity, etc.

In the example shown, visualization 300 comprises road segment 305 (e.g., corresponding to I-95 near Miami) and visualization 300 is configured to identify that road segment 305 is subject to a particular road condition. Conversely, road segment 310 (e.g., corresponding to a different segment of I-95, such as north of West Palm Beach) is indicated to be associated with (e.g., tagged as) a clear road condition. Similarly, visualization 300 comprises road segment 315 and road segment 320 corresponding to portions of I-10 between Houston and Jacksonville. Road segment 315 is identified as being associated with a clear road condition. Conversely, road segment 320 (e.g., a segment between Houston and New Orleans) is identified as being subject to a particular road condition.

Figure 3B:
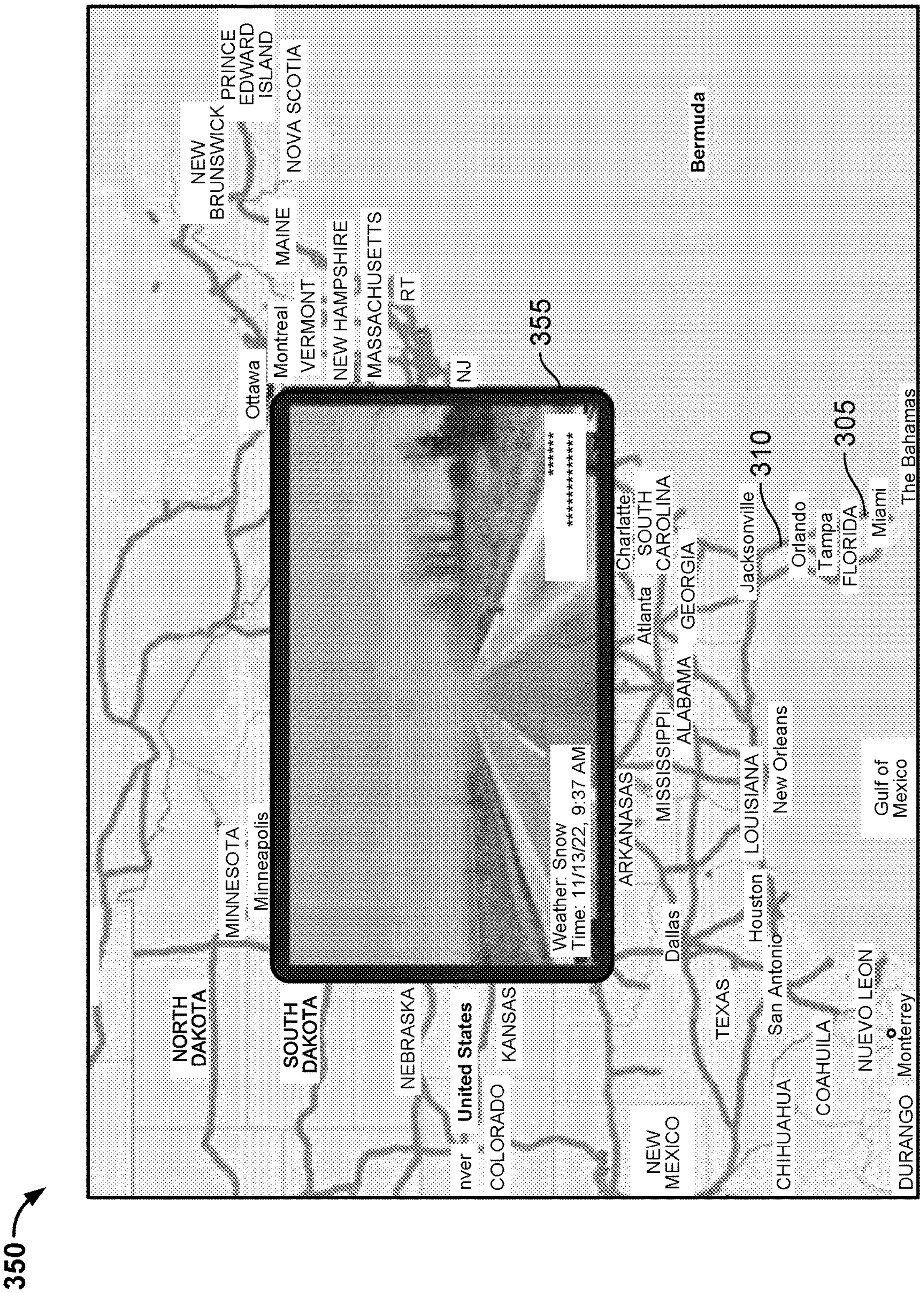
FIG. 3B illustrates an example of a captured image overlaid with visualization of a road condition on a map according to various embodiments.

FIG. 3B illustrates an example of a captured image overlaid with visualization of a road condition on a map according to various embodiments. In some embodiments, visualization 350 is generated by the system of FIG. 1 and/or the system of FIG. 2. In the example shown, visualization 350 illustrates a unified map comprising a part of North America and other relevant map data. In some embodiments, an image 355 can be displayed overlaid with the map. The image 355 may be displayed in response to a user (e.g., a fleet manager) requesting to display an image for a particular location on the map. For example, the map may comprise indications of locations on the map having corresponding images (e.g., images collected within a threshold period of time or for which a managed vehicle can be queried to collect a contemporaneous image). In response to selection of the location (e.g., an image icon), image 355 is overlaid with the map to provide a close-up view of the road as appearing on a vehicle travelling over the road or as captured by a DOT camera. The fleet manager can use image 355 to confirm the road condition classification. In some embodiments, image 355 is made available to a driver (e.g., via a mobile application). The driver can use the image information to determine a course of action—for example, in the case of snow, depending on company policy and/or vehicle type, some drivers may be comfortable driving in low levels of snow, whereas in high levels of snow a driver may not be comfortable.

Figure 4:
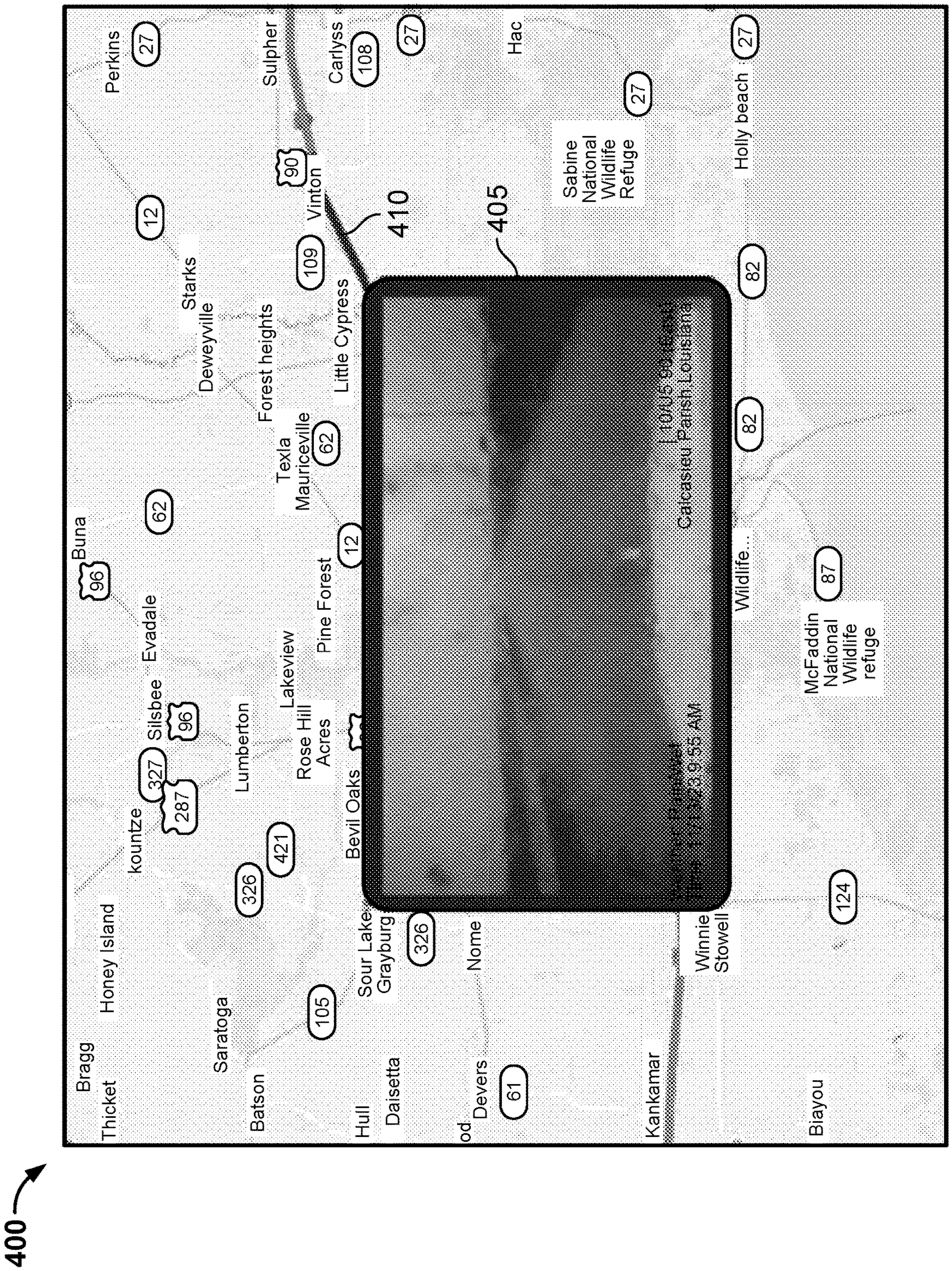
FIG. 4 illustrates an example of a captured image overlaid with visualization of a road condition on a map according to various embodiments.

FIG. 4 illustrates an example of a captured image overlaid with visualization of a road condition on a map according to various embodiments. In some embodiments, visualization 400 is generated by the system of FIG. 1 and/or the system of FIG. 2. In the example shown, visualization 400 comprises a map with image 405 overlaid with respect to the map. Image 405 corresponds to a captured image for a particular location on the map (e.g., a location selected by a user such as a fleet manager), such as road segment 410 which is emphatically displayed, thereby indicating that the road condition for road segment 410 is non-clear.

Figure 5A:
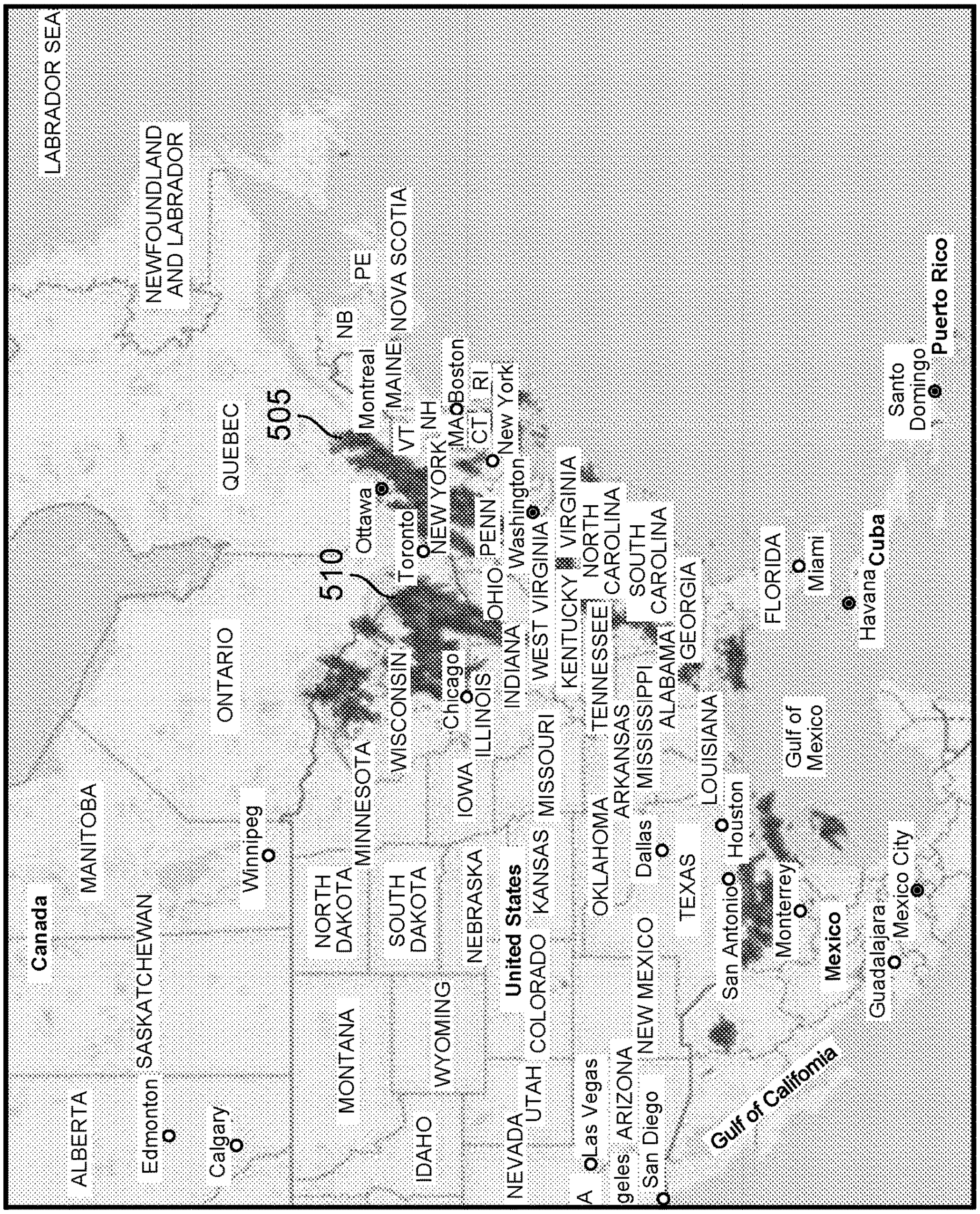
FIG. 5A illustrates an example of a visualization of weather data on a map according to various embodiments.
Figure 5B:
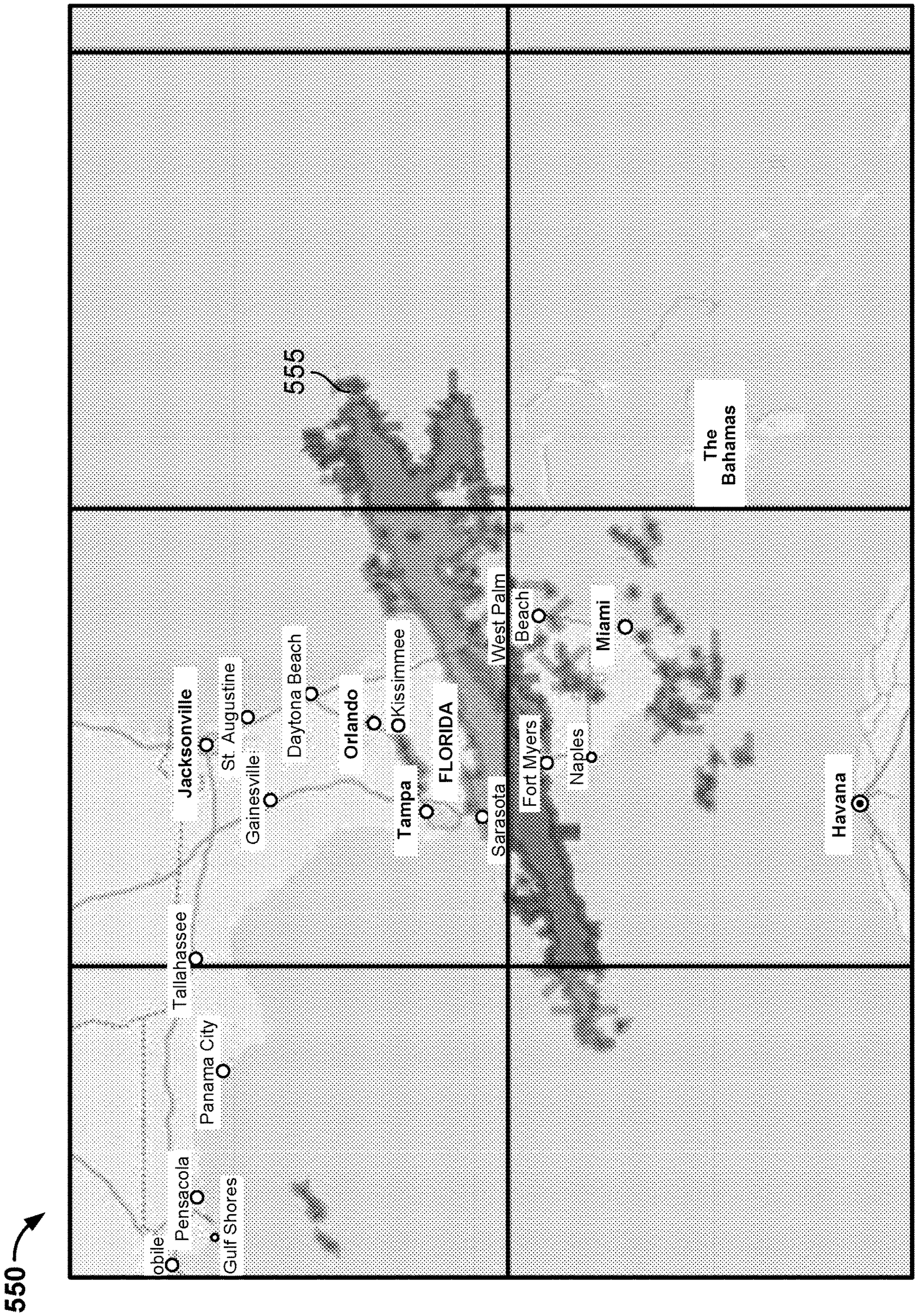
FIG. 5B illustrates an example of a visualization of weather data on a map according to various embodiments.

FIGS. 5A and 5B illustrate an example of a visualization of weather data on a map according to various embodiments. In some embodiments, map 500 and/or map 550 is/are generated by the system of FIG. 1 and/or the system of FIG. 2. In the examples shown, map 500 and map 550 illustrate weather data overlaid with respect to maps. Map 500 is a map of North America, and map 550 is a map of Florida. Portions of the weather data comprising a weather event or weather risk (e.g., precipitation events) are displayed according to their respective locations. For example, weather event 505, weather event 510, and weather event 555 are respectively overlaid with map 500 or map 550. In some embodiments, the displayed weather data (e.g., the outlines around precipitation areas) are used to determine the road segments from which images need to be fetched and analyzed (e.g., those segments that are along the road and within the precipitation area).

In some embodiments, vector geometries derived from weather data (e.g., weather precipitation raster data) are used to prioritize the scanning (e.g., collecting corresponding images and determining a road condition classification) of road segments that geometrically intersect with the weather vector geometries. For example, the system uses the intersection of vector geometries of a weather risk/event and a road segment(s) to trigger the poll/pull of vehicle imagery (e.g., to query a managed vehicle for an image at the particular road segment). The system uses the collected image to perform a classification (e.g., a machine vision artificial intelligence service weather analysis). As illustrated, the outline of the weather event/risk can be emphatically displayed. As an example, a red outline can be drawn around the weather event (e.g., the vector geometries for the weather event/risk). The weather event/risk can be displayed in a different color or with different shading, etc. For example, the weather event/risk can be displayed in a blue/green color.

Figure 6A:
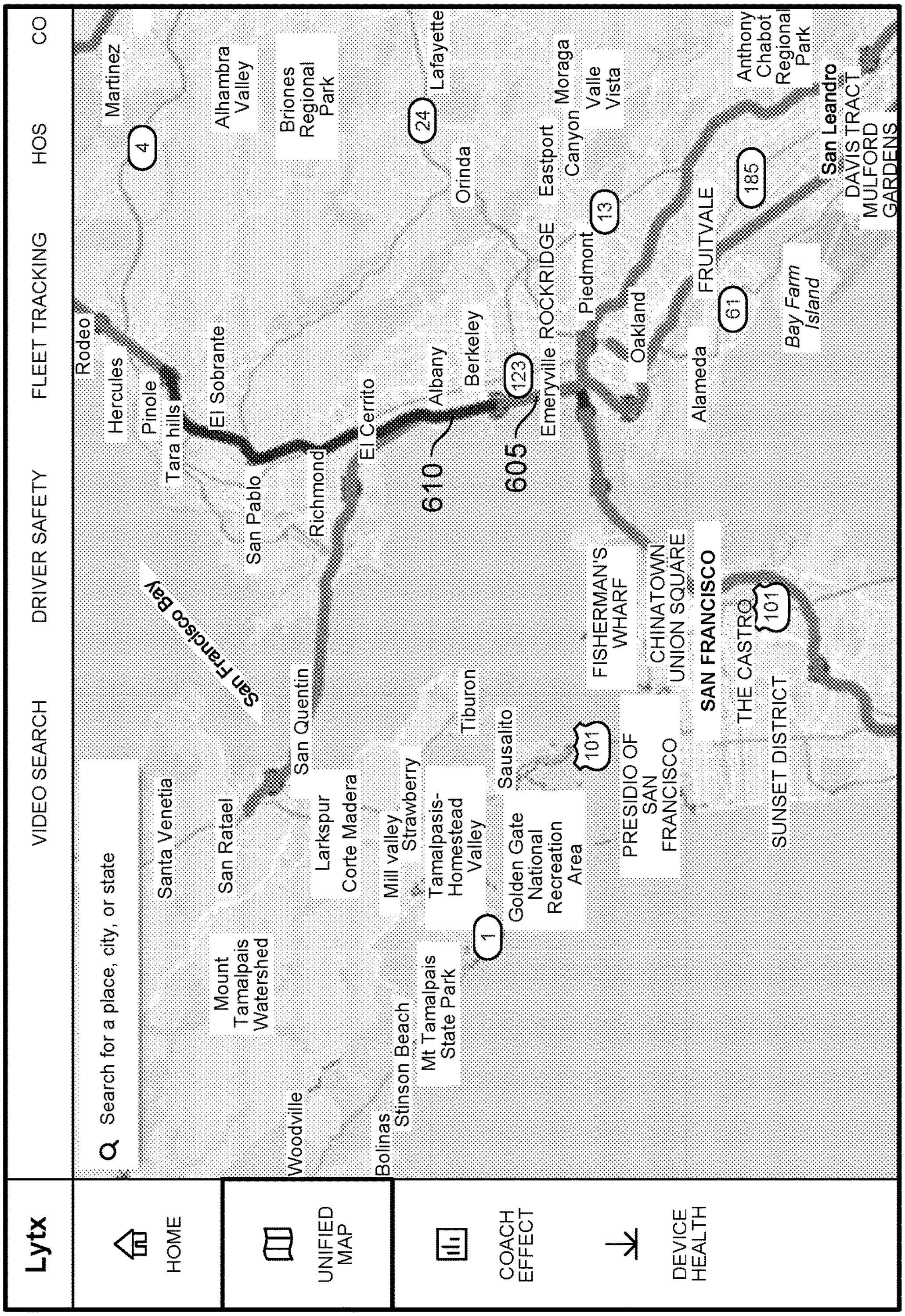
FIG. 6A illustrates an example of a visualization of a map of a geographic area comprising a set of road segments according to various embodiments.
Figure 6B:
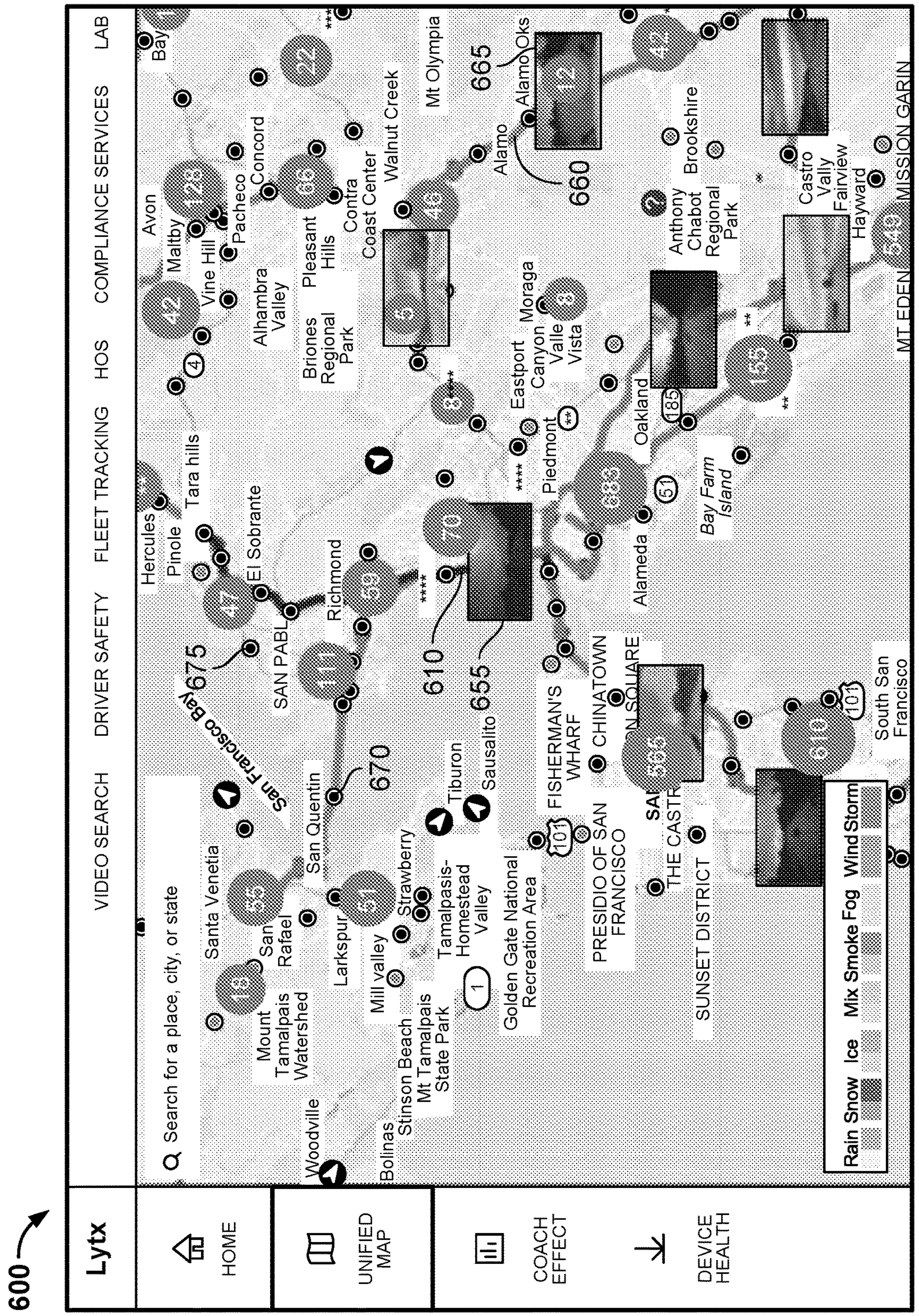
FIG. 6B illustrates an example of a visualization of a map of a geographic area comprising a set of road segments according to various embodiments.

FIGS. 6A and 6B illustrate an example of a visualization of a map of a geographic area comprising a set of road segments according to various embodiments. In some embodiments, user interface 600 is generated by the system of FIG. 1 and/or the system of FIG. 2. In the example shown, the system configures user interface 600 to display a unified map. The system can configure the unified map to comprise different types of information, such as based on user preferences or user selection. For example, the unified map may comprise a plurality of layers which can be toggled on or off to present different types of data overlaid with respect to a map.

As illustrated in FIG. 6A, the unified map comprises an emphatic display of certain roads, such as interstate highways. The roads to be emphatically displayed can be determined based at least in part on user input, such as from a fleet manager. In the example shown, highways 80 and 580 are emphatically displayed, and various road segments are displayed differently based on an associated road condition. For example, the display of road segment 605 is configured to indicate that road segment 605 has a clear road condition. Conversely, the display of road segment 610 is configured to indicate that road segment 610 has a certain type of road condition. In some embodiments, the type of road condition can be indicated based on a coloring of the road segments, a shading of the road segments, a line width of the road segments, etc.

In some embodiments, the unified map uses the original OpenStreetmap road segment LineStrings to represent a centerline of the road. The OpenStreetmap road segment LineStrings can be expanded to a Polygon that accurately represents the pavement area of the road using metadata such as the number of lanes, DOT lane width guidelines for each road type, urban density, etc.

The system can create highway "road pavement" areas derived from segmentized LineStrings. These segmented road areas are used by the unified map service to poll current vehicles traveling along a set of road segments for road classification (e.g., a machine vision AI weather analysis). In some embodiments, these road areas are not displayed to the client-facing unified map user interface (UI), such as illustrated in FIGS. 6A and 6B.

The system (e.g., based on selection from a fleet manager) can highlight (or otherwise emphatically display) road segment LineStrings within the unified map, as shown in FIGS. 6A and 6B. As an example, the highlighted road segments are presented as thicker lines but do not represent the "road pavement area" road segment data.

According to various embodiments, the geographical position of each road segment "pavement area" geometry is intersected with a vehicle location of a set of managed vehicles (e.g., a current or recent past (e.g., within N minutes, where N is 5, 10, 15, 30, 60, etc.) GPS position of vehicles) that are currently traveling along the same paved roadway area to find active vehicles to poll for a video or image (or query to collect a captured image) for weather conditions within the road segment. These videos or images can then be analyzed by the machine learning model (e.g., a weather machine vision AI service) that is configured to predict road conditions based at least in part on the image data (e.g., the collected/scanned images or videos). The machine learning model analyzes/classifies the images to detect the current weather conditions for vehicles traveling within each segment. Each highway road segment is then tagged with the appropriate weather conditions which is presented to the user.

In the example shown in FIG. 6B, the user interface comprises a set of vehicle indicators, such as indicator 670 and indicator 675, that indicate the presence of a vehicle (e.g., a managed vehicle) at the corresponding location on the map. These vehicles may be manually or automatically polled or queried for vehicle information and/or image data (e.g., raw/captured images or an indication of a road condition classification performed by a vehicle-side model/classifier). Additionally, or alternatively, one or more collected images may be displayed as an overlay to the map. In the example shown, collected images such as image 655 and image 665 are overlayed with the map. The collected images may be presented as an overlay in an area of the map corresponding to a location at which the image was captured. Road segment 610 is displayed to indicate a road segment of a certain type.

In some embodiments, a number in a circle (e.g., circle 672 showing value 111) represents a cluster of current active vehicles in a geographic region in the vicinity of the circle. Each vehicle is capable of detecting the weather road conditions on the road using their dash camera. The circles represent groups of active vehicles in a location—for example, rather than showing 111 individual vehicle arrows in a location, the system groups them into a count of 111 and displays them in circle 672. As you zoom in the count bubble breaks up into smaller bubbles until it eventually disappears altogether revealing all the individual vehicles.

Figure 7:
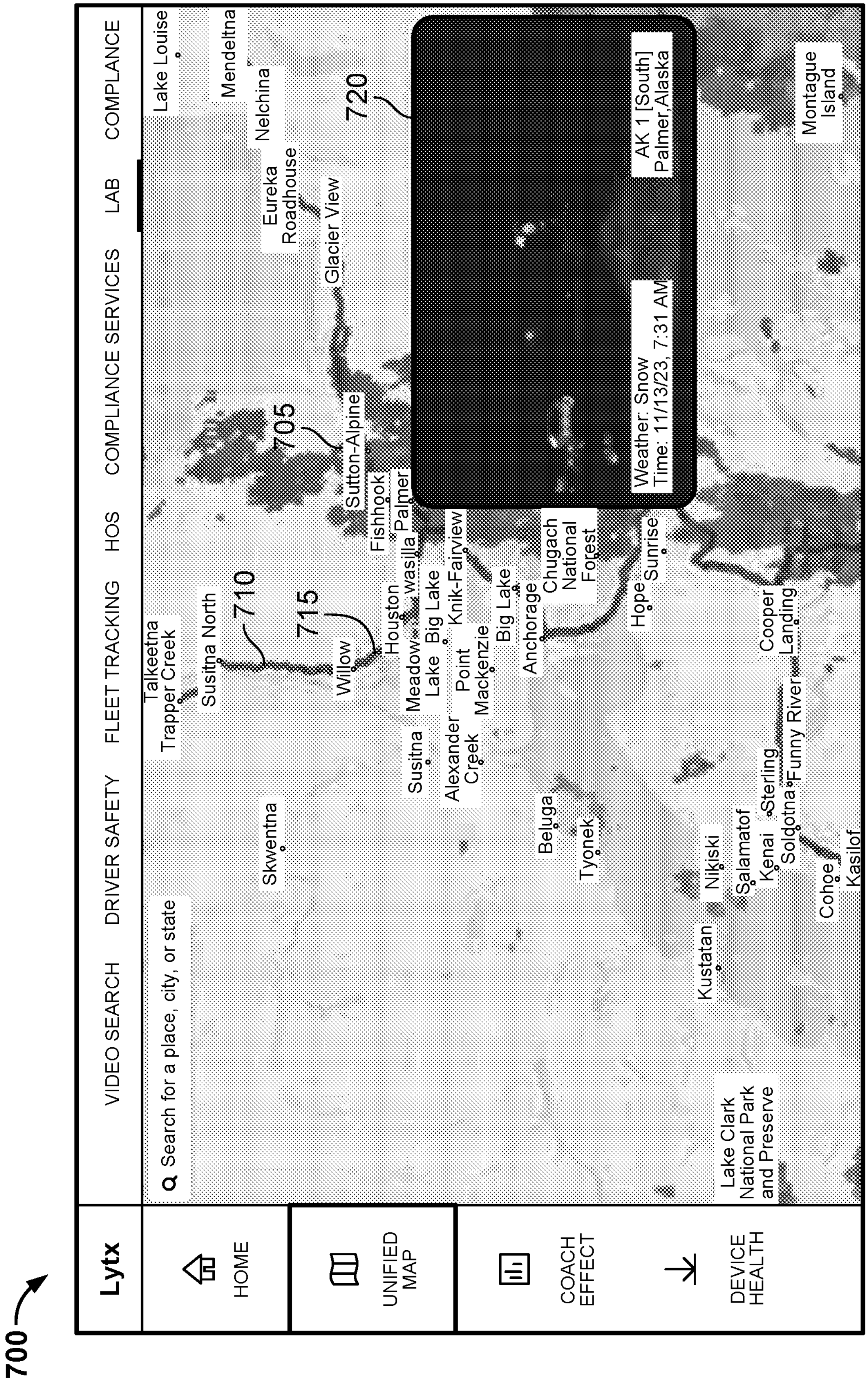
FIG. 7 illustrates an example of a captured image overlaid with visualization of a road condition on a map according to various embodiments.

FIG. 7 illustrates an example of a captured image overlaid with visualization of a road condition on a map according to various embodiments. In some embodiments, user interface 700 is generated by the system of FIG. 1 and/or the system of FIG. 2. In the example shown, user interface 700 comprises a unified map, such as a map with various overlays presented to communicate different types of information. As illustrated, the map comprises a representation of weather event 705 overlaid with the map. Additionally, the map comprises indicators for various roads within the map, including road segment 710 and road segment 715. The display of various roads (or road segments) can be differently configured based on an associated road condition. For example, road segment 710 is displayed to indicate that the road has a clear condition. Conversely, road segment 715 is displayed in a different manner (e.g., a different color, shading, line width, etc.).

The unified map further comprises image 720 overlaid with the map. Image 720 can be shown upon selection of a corresponding road segment—for example, for a fleet manager to pull a recent or current image of the road segment, such as to confirm the road condition classification predicted by the machine learning model.

The unified map may be configured to have a default length of road segments (e.g., road segments for which an image classification is to correspond). As an illustrative example, the default length of a road segment is 10 miles. However, as the zoom for the unified map is changed, the road segment lengths are adjusted to simplify the geometry of the roads and to provide a crisp map. For example, as the unified map is zoomed out, a plurality of road segments (e.g., adjacent road segments) can be aggregated into an aggregated road segment, or parent road segment. The road condition for the aggregated road segment is determined—for example, by aggregating the road conditions for the plurality of road segments to obtain an aggregated road condition. As an example, in a zoomed-out configuration, the road segments are provided with lengths of 100 miles.

The original 10-mile weather road segments are merged into the single 100-mile weather road segment. In some embodiments, the dominant weather condition among the plurality of 10-mile weather road segments are summarized and presented to the user as the road condition for the single 100-mile weather road segment. The system may store the road segments according to a hierarchal numbering system for each road segment to enable the system to find the child road segments of each parent 100-mile length segments.

Figure 8:
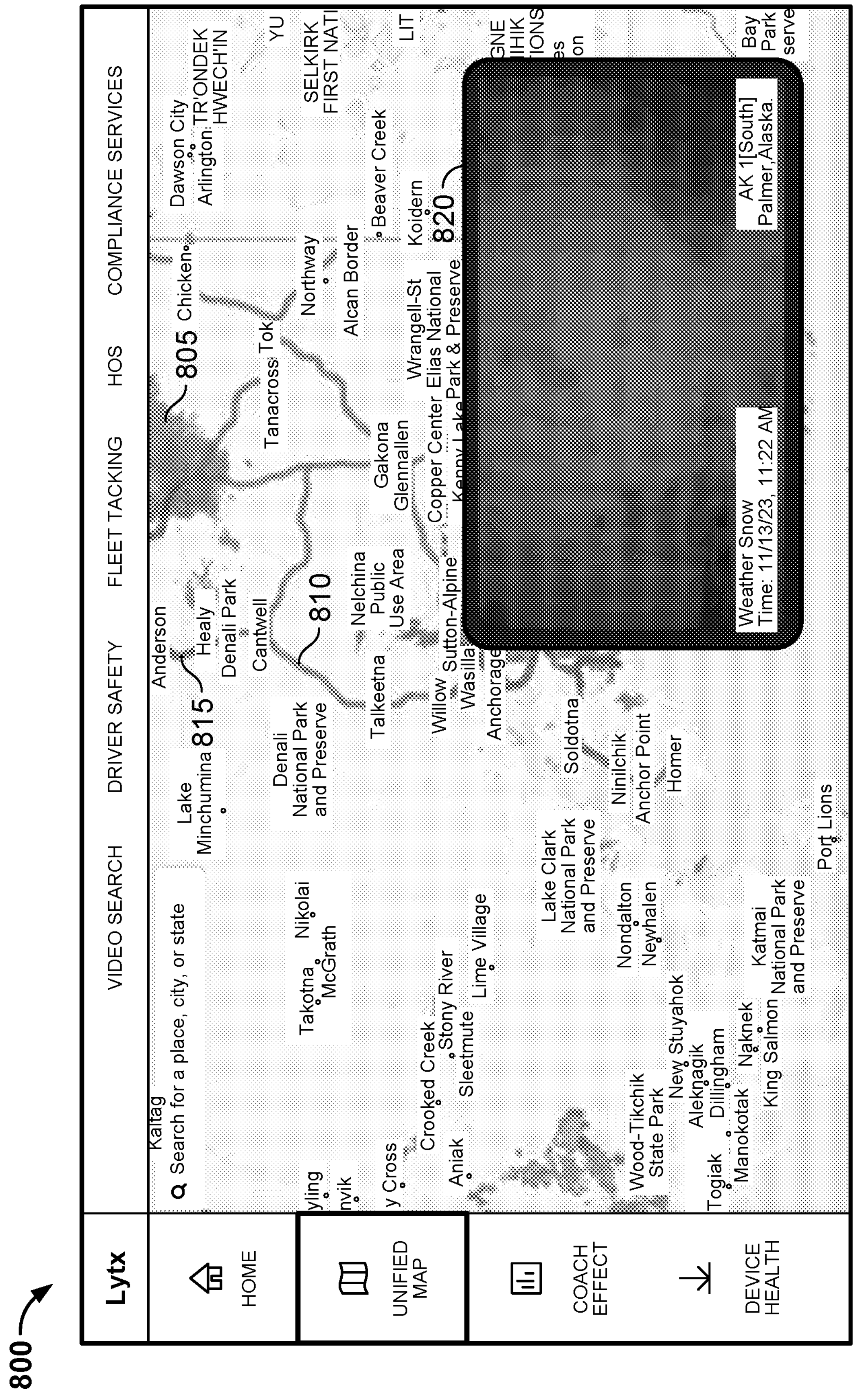
FIG. 8 illustrates an example of a captured image overlaid with visualization of a road condition on a map according to various embodiments.

FIG. 8 illustrates an example of a captured image overlaid with visualization of a road condition on a map according to various embodiments. In some embodiments, user interface 800 is generated by the system of FIG. 1 and/or the system of FIG. 2. In the example shown, user interface 800 comprises a unified map, such as a map with various overlays presented to communicate different types of information. As illustrated, the map comprises a representation of weather event 805 overlaid with the map. Additionally, the map comprises indicators for various roads within the map, including road segment 810 and road segment 815. The display of various roads (or road segments) can be differently configured based on an associated road condition. For example, road segment 810 is displayed to indicate that the road has a clear condition. Conversely, road segment 815 is displayed in a different manner (e.g., a different color, shading, line width, etc.).

In some embodiments, the system dynamically creates road segments of varying lengths that are affected by a specific weather condition instead of using precomputed highway road segments at fixed lengths. A specific device/vehicle could save the GPS point where adverse weather is first detected by classifying an image (e.g., analyzing a captured image using a machine vision AI service) and also the GPS point where the adverse weather is no longer detected. The system can then create a highway road segment (e.g., LineString) between these two points. The highway road segment can be presented to the user on the map (e.g., a unified map).

In some embodiments, the vehicle-side road classification uses a ML model and related image analysis software running in the vehicle endpoint/device that continuously scans for weather conditions at a much higher rate than server-side road classification using polling that was described previously. The system on the vehicle endpoint/device can always be scanning for road conditions without requiring NOAA weather data to determine where to start and stop scanning for road conditions.

In some embodiments, this allows creating much more granular road segments (compared to the predetermined 10-mile road segments used for cloud-side road weather condition classification) for each weather condition by recording the road's start point of where the weather condition was first detected and the road's end point where the weather condition last detected. These road's start and end points can be used to create the granular weather road segment only where the detected weather conditions are in effect within the geospatial database as seen in FIG. 9.

Figure 9:
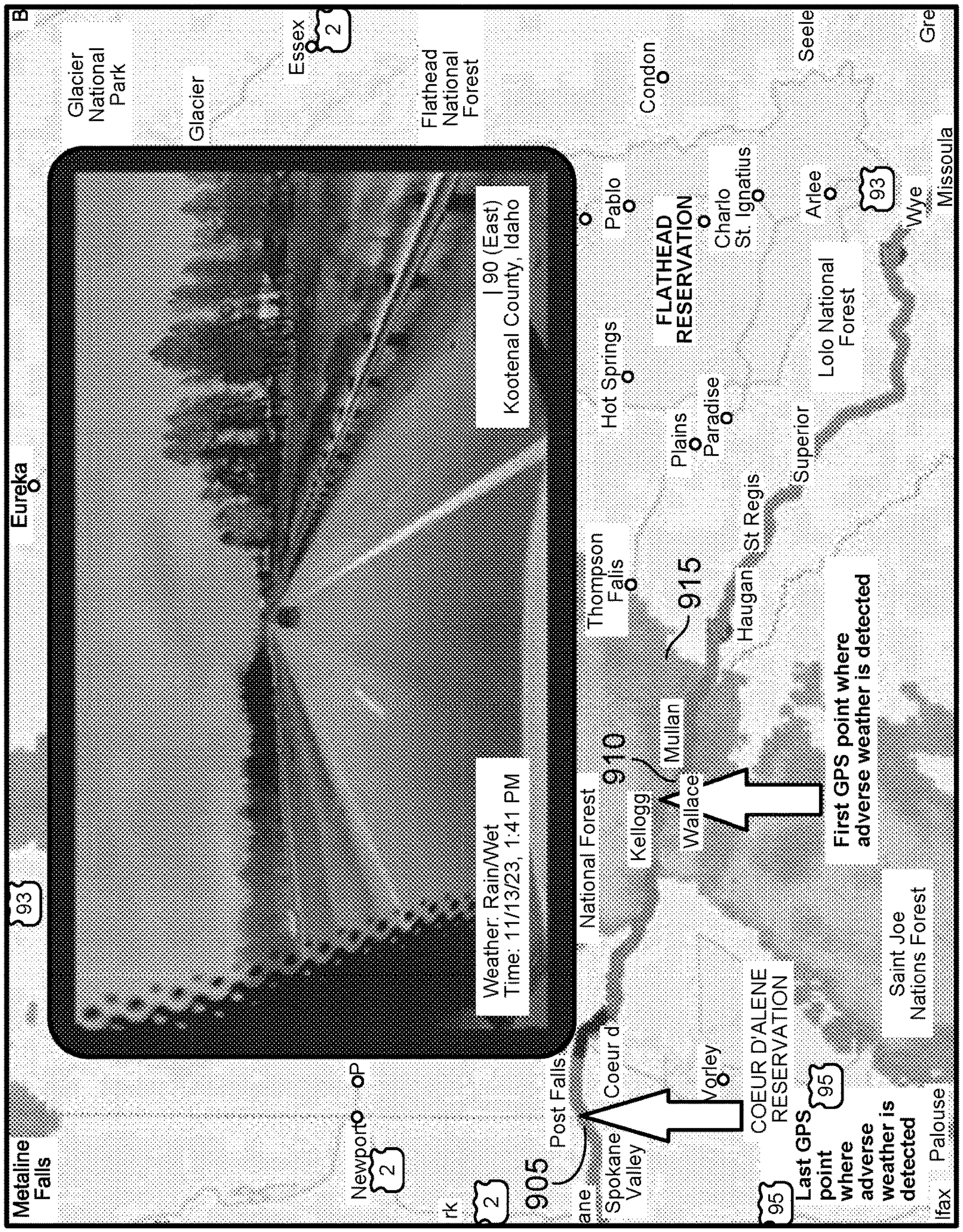
FIG. 9 illustrates an example of a captured image overlaid with visualization of a road condition on a map according to various embodiments.

FIG. 9 illustrates an example of a captured image overlaid with visualization of a road condition on a map according to various embodiments. In some embodiments, user interface 900 is generated by the system of FIG. 1 and/or the system of FIG. 2. In the example shown, the weather event or risk 915 of user interface 900 is last detected. Similarly, indicator 910 corresponds to the location at which the adverse weather is first detected. The system may use the segment between indicator 905 and indicator 910 to be a single road segment for which a classified image 920 is to be representative.

Figure 10A:
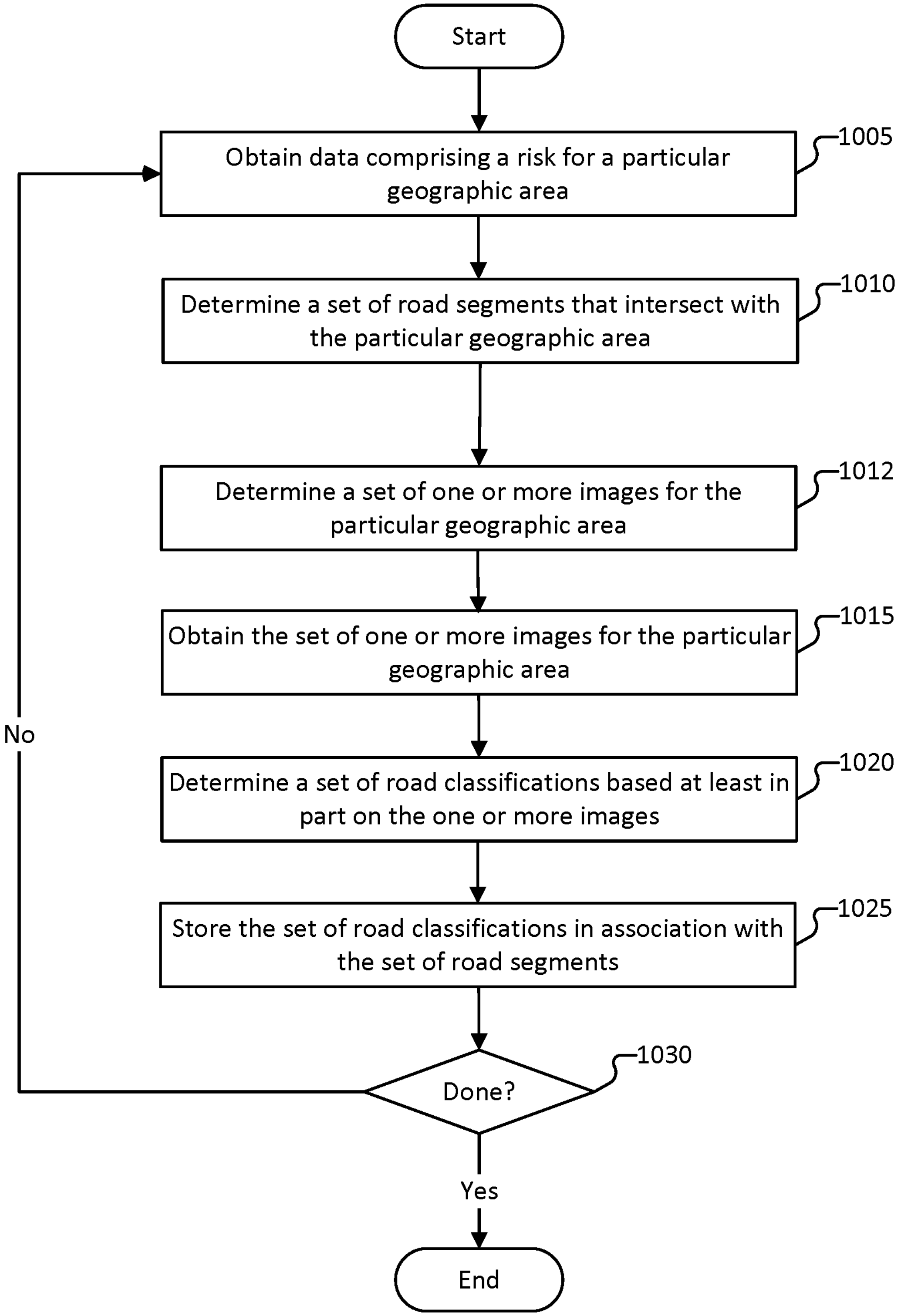
FIG. 10A is a flow diagram of a method for determining a road condition for a road segment according to various embodiments of the present application.

FIG. 10A is a flow diagram of a method for determining a road condition for a road segment according to various embodiments of the present application. In some embodiments, process 1000 is implemented at least in part by system 100 of FIG. 1 and/or system 200 of FIG. 2. In some embodiments, the flow diagram of FIG. 10A is used to implement a process on a vehicle data server to determine a road condition.

At 1005, the system obtains data comprising a risk for a particular geographic area. For example, the system obtains the data (e.g., a real time stream of weather data indicating weather event such as rain, snow, wind, sleet, etc. locations) from a third-party service (e.g., a weather service such as National Oceanic and Atmospheric Administration). At 1010, the system determines a set of road segments that intersect with the particular geographic area. For example, the system identifies one or more road segments that overlap the geographic area with the risk (e.g., the road segments that are in an area where it is raining, snowing, foggy, etc.). At 1012, the system determines a set of one or more images for the particular geographic area. For example, using database information, the system determines vehicle(s) that have traveled through the geographic area and have images during a relevant time window. At 1015, the system obtains a set of one or more images for the particular geographic area. For example, the one or more images can be fetched from a database storing a set of images sent (e.g., periodically) from a set of managed vehicles. Additionally or alternatively, the system fetches the images (e.g., a real time set of images) by querying one or more vehicles having locations (e.g., current vehicle location, or expected location within a predetermined period of time, or a previous location of the vehicle within a predefined period of time) corresponding to the set of road segments intersecting the particular geographic area. At 1020, the system determines a set of road classifications based at least in part on the one or more images. For example, the one or more images are collectively or serially analyzed to determine one or more labels or identifications or road classifications that are associated with the individual or collective group of images. In some embodiments, the system determines the set of road classifications by querying a classifier (e.g., a machine learning model) to predict a road condition classification for the set of one or more images. At 1025, the system stores the set of road classifications in association with the road segments. For example, the classifications are stored in a database associated with a vehicle data server (e.g., a cloud-based storage system). At 1030, a determination is made as to whether process 1000 is complete. In some embodiments, the process is determined to be not complete in the event that more real time determinations of risk or acquisition and analysis of images is to be performed—for example, a stream of data regarding risk situations or a stream of images that need to be analyzed for classification. In some embodiments, process 1000 is determined to be complete in response to a determination that no further road segments are to be classified, no further road classifications are to be determined based on images for a geographic area, user indicates that process 1000 is to be paused or stopped, etc. In response to a determination that process 1000 is complete, process 1000 ends. In response to a determination that process 1000 is not complete, process 1000 returns to 1005.

Figure 10B:
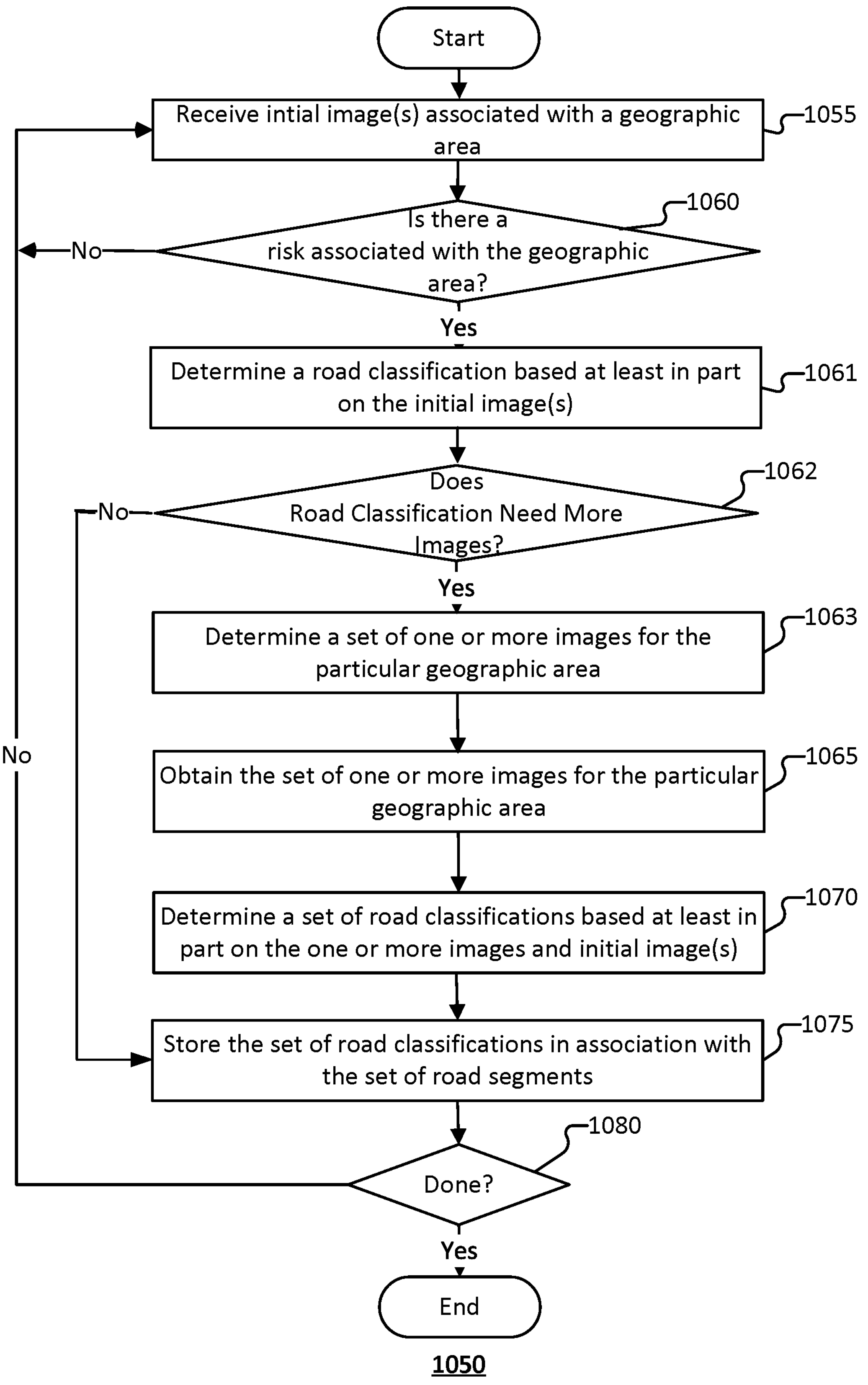
FIG. 10B is a flow diagram of a method for determining a road condition for a road segment according to various embodiments of the present application.

FIG. 10B is a flow diagram of a method for determining a road condition for a road segment according to various embodiments of the present application. In some embodiments, process 1050 is implemented at least in part by system 100 of FIG. 1 and/or system 200 of FIG. 2. In some embodiments, the flow diagram of FIG. 10B is used to implement a process on a vehicle event recorder to determine a road condition.

At 1055, initial image(s) is/are received associated with a geographic area. For example, a vehicle event recorder takes one or more images (e.g., a real time set of images) and associates the image(s) with a geographic area (e.g., global positioning data is recorded at a similar time). At 1060, it is determined whether there is a risk associated with the geographic area. For example, the system determines whether an image of the initial image(s) depict(s) a risky situation (e.g., a weather condition such as rain, snow, fog, sleet, hail, etc. or any other risky situation such as a construction zone or a hazard in the road like a tire or other obstruction). In response to determining that there is not a risk associated with the geographic area, control passes to 1055. In response to determining that there is a risk associated with the geographic area, control passes to 1061. In some embodiments, the system omits 1060—for example, an associated risk with a geographic area is not determined at 1060 (e.g., using external indication(s) of weather and/or other indication(s) of risk such as a weather database indication, a traffic database indication, etc.) and instead is performed at 1061. At 1061, a road classification is determined based at least in part on the initial image(s). At 1062, it is determined whether the road classification need more images. For example, it is determined if additional images are needed based on the hazard type associated with the road condition. If so, it fetches them, if not, it does not, it just tags the segment. As an example, for fog the system fetches additional images since the system wants to verify it's not just a windshield that needs defrosting. However, if there is an object on the road like a tire or an animal, the system would likely just tag the segment based on the initial image(s) without fetching more. In response to determining that the road classification does not need more images, control passes to 1075. In response to determining that the road classification does need more images, control passes to 1063. At 1063, the system determines a set of one or more images for the particular geographic area. For example, using database information, the system determines vehicle(s) that have traveled through the geographic area and have images during a relevant time window. At 1065, the system obtains a set of one or more images for the particular geographic area. For example, the one or more images can be fetched from a database storing a set of images sent (e.g., periodically) from a set of managed vehicles (e.g., a database a vehicle data server). Additionally or alternatively, the system fetches the images (e.g., a real time set of images) by querying one or more vehicles having locations (e.g., current vehicle location, or expected location within a predetermined period of time, or a previous location of the vehicle within a predefined period of time) corresponding to the set of road segments intersecting the particular geographic area. At 1070, the system determines a set of road classifications based at least in part on the one or more images and the initial image(s). For example, the one or more images and the initial image(s) are collectively or serially analyzed to determine one or more labels or identifications or road classifications that are associated with the individual or collective group of images. In some embodiments, the system determines the set of road classifications by querying a classifier (e.g., a machine learning model) to predict a road condition classification for the set of one or more images and/or the initial image(s). At 1075, the system stores the set of road classifications in association with the road segments. For example, the classifications are stored in a database associated with a vehicle data server (e.g., a cloud-based storage system). At 1080, a determination is made as to whether process 1050 is complete. In some embodiments, process 1050 is determined to be complete in response to a determination that no further road segments are to be classified, no further road classifications are to be determined based on images for a geographic area, user indicates that process 1050 is to be paused or stopped, etc. In response to a determination that process 1050 is complete, process 1050 ends. In response to a determination that process 1050 is not complete, process 1050 returns to 1055.

In some embodiments, process 1050 is implemented using a vehicle event recorder processor and a vehicle data server processor. For example, an image is taken in 1055 and a risk is determined in 1060 by a vehicle event recorder, but in response to there being a risk, the image and associated data is sent to a vehicle data server to be aggregated, classified, and stored (e.g., as in 1061, 1062, 1063, 1065, 1070, and 1075). In some embodiments, other splits of which steps are performed by which processor are possible.

Figure 11:
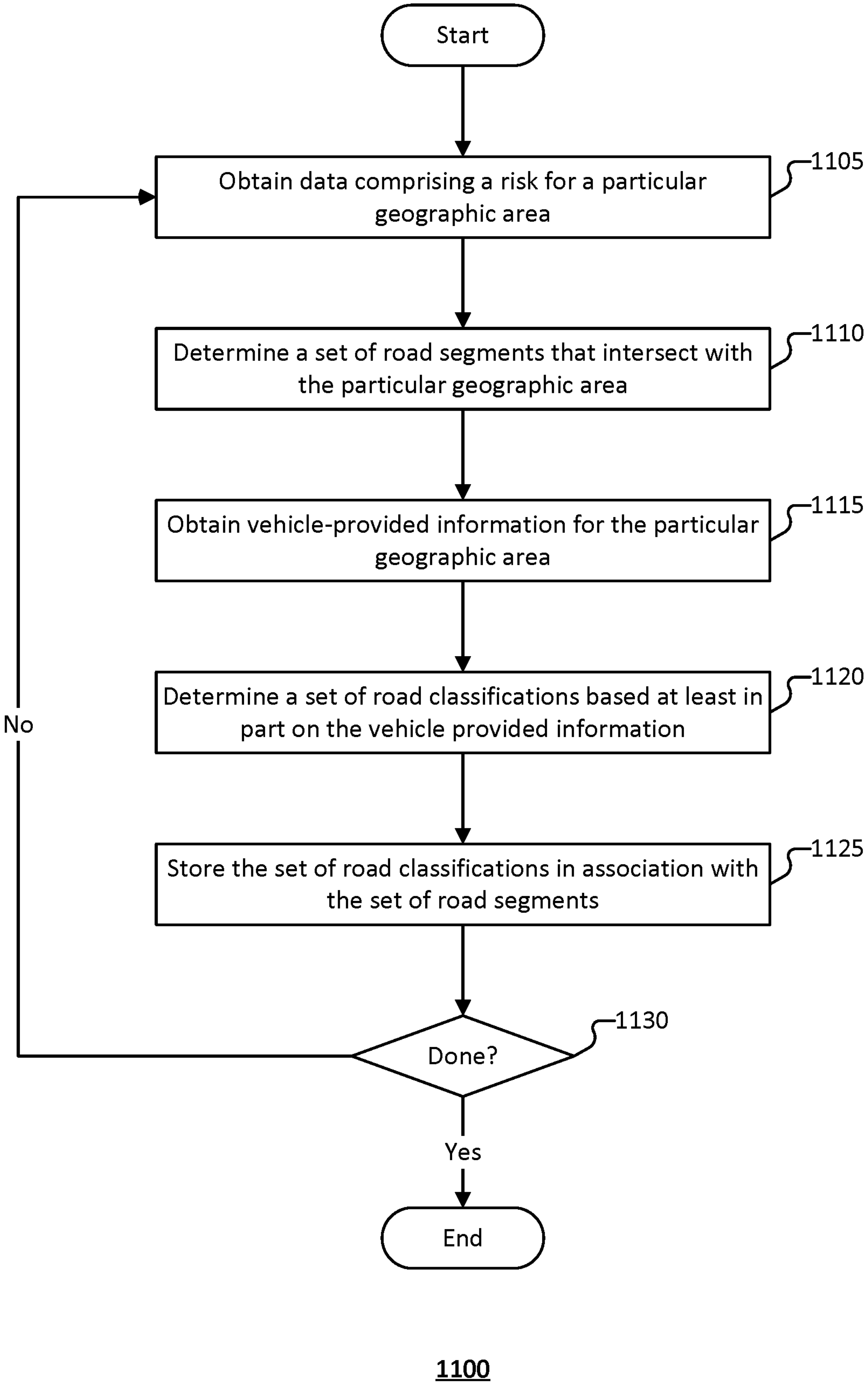
FIG. 11 is a flow diagram of a method for determining a road condition for a road segment according to various embodiments of the present application.

FIG. 11 is a flow diagram of a method for determining a road condition for a road segment according to various embodiments of the present application. In some embodiments, process 1100 is implemented at least in part by system 100 of FIG. 1 and/or system 200 of FIG. 2.

At 1105, the system obtains data comprising a risk for a particular geographic area. In some embodiments, the vehicle (e.g., a signal from the vehicle event recorder)

indicates to the server when weather is encountered (e.g., a determination is made on a vehicle event recorder that a weather event—such as rain, snow, hail, etc.—has occurred and is sent to the server). In some embodiments, a server receives other data (e.g., weather station data, weather database data, etc.) that indicates a weather event in a geographic area. At 1110, the system determines a set of road segments that intersect with the particular geographic area. At 1115, the system obtains vehicle-provided information for the particular geographic area. The vehicle-provided information comprises a vehicle-side road condition classification (e.g., a classification that was generated locally at the vehicle). Additionally, the vehicle-provided information may comprise a location corresponding to the road condition classification or a particular road segment for which the road condition classification is valid. The vehicle-provided information may comprise various other data, such as timestamp information (e.g., date, time, time zone, etc.) for the image or road condition classification, a vehicle identifier, etc.

At 1120, the system determines a set of road classifications based at least in part on the vehicle provided information. In some embodiments, the system determines a road condition classification for a particular road segment based on a plurality of road condition classifications reported by a plurality of vehicles. The system can determine an aggregated road condition according to one or more predefined rules (e.g., aggregation rules) and use the aggregated road condition as the representative road condition for the particular road segment. At 1125, the system stores the set of road classifications in association with the set of road segments. At 1130, a determination is made as to whether process 1100 is complete. In some embodiments, process 1100 is determined to be complete in response to a determination that no further road segments are to be classified, no further road classifications are to be determined based on images for a geographic area, user indicates that process 1100 is to be paused or stopped, etc. In response to a determination that process 1100 is complete, process 1100 ends. In response to a determination that process 1100 is not complete, process 1100 returns to 1105.

Figure 12:
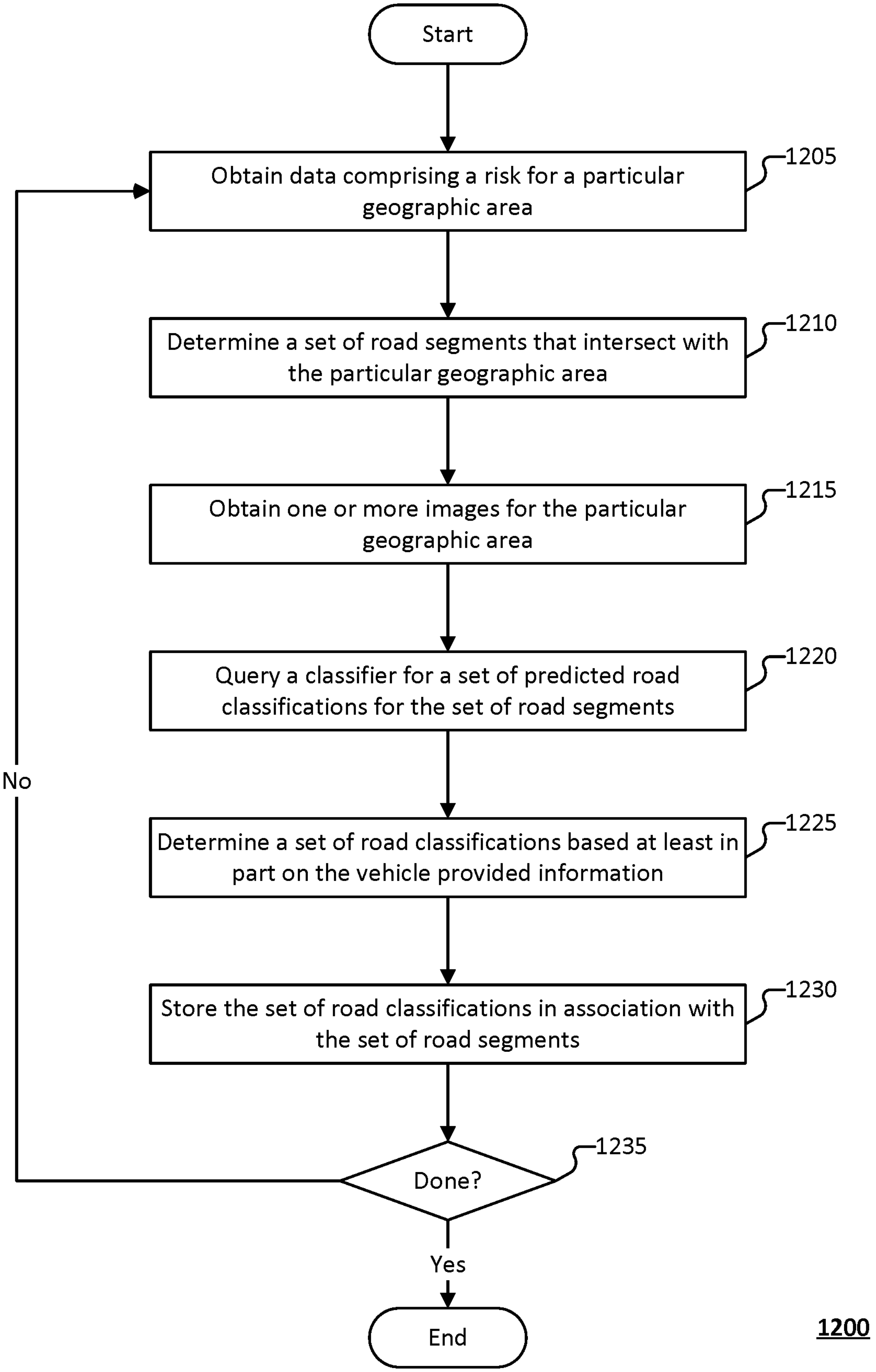
FIG. 12 is a flow diagram of a method for determining a road condition for a road segment according to various embodiments of the present application.

FIG. 12 is a flow diagram of a method for determining a road condition for a road segment according to various embodiments of the present application. In some embodiments, process 1200 is implemented at least in part by system 100 of FIG. 1 and/or system 200 of FIG. 2.

At 1205, the system obtains data comprising a risk for a particular geographic area. At 1210, the system determines a set of road segments that intersect with the particular geographic area. At 1215, the system obtains one or more images for the particular geographic area. At 1220, the system queries a classifier for a set of predicted road classifications for the set of road segments. At 1225, the system determines a set of road classifications based at least in part on the vehicle provided information. At 1230, the system stores the set of road classifications in association with the set of road segments. At 1235, a determination is made as to whether process 1200 is complete. In some embodiments, process 1200 is determined to be complete in response to a determination that no further road segments are to be classified, no further road classifications are to be determined based on images for a geographic area, user indicates that process 1200 is to be paused or stopped, etc. In response to a determination that process 1200 is complete, process 1200 ends. In response to a determination that process 1200 is not complete, process 1200 returns to 1205.

Figure 13:
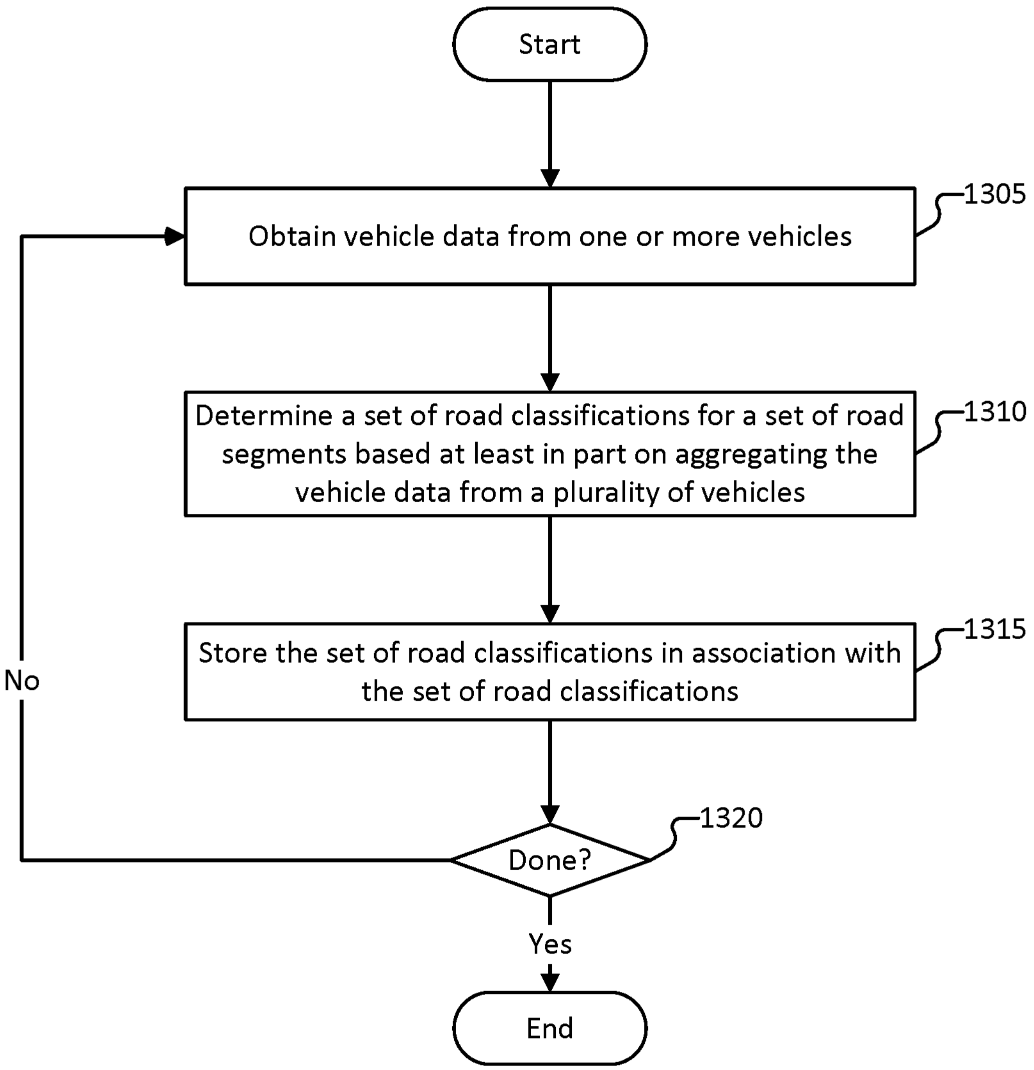
FIG. 13 is a flow diagram of a method for determining a road condition for a road segment according to various embodiments of the present application.

FIG. 13 is a flow diagram of a method for determining a road condition for a road segment according to various embodiments of the present application. In some embodiments, process 1300 is implemented at least in part by system 100 of FIG. 1 and/or system 200 of FIG. 2.

At 1305, the system obtains vehicle data from one or more vehicles. In some embodiments, vehicle data comprises a road condition classification made by the vehicle event recorder. At 1310, the system determines a set of road classifications for a set of road segments based at least in part on aggregating the vehicle data from a plurality of vehicles. At 1315, the system stores the set of road classifications in association with the set of road classifications. At 1320, a determination is made as to whether process 1300 is complete. In some embodiments, process 1300 is determined to be complete in response to a determination that no further samples are to be obtained, no further images are to be processed, no further images are obtained, no further vehicle data is to be classified, no further road classifications are to be determined for a road segment, a user indicates that process 1300 is to be paused or stopped, etc. In response to a determination that process 1300 is complete, process 1300 ends. In response to a determination that process 1300 is not complete, process 1300 returns to 1305.

Figure 14:
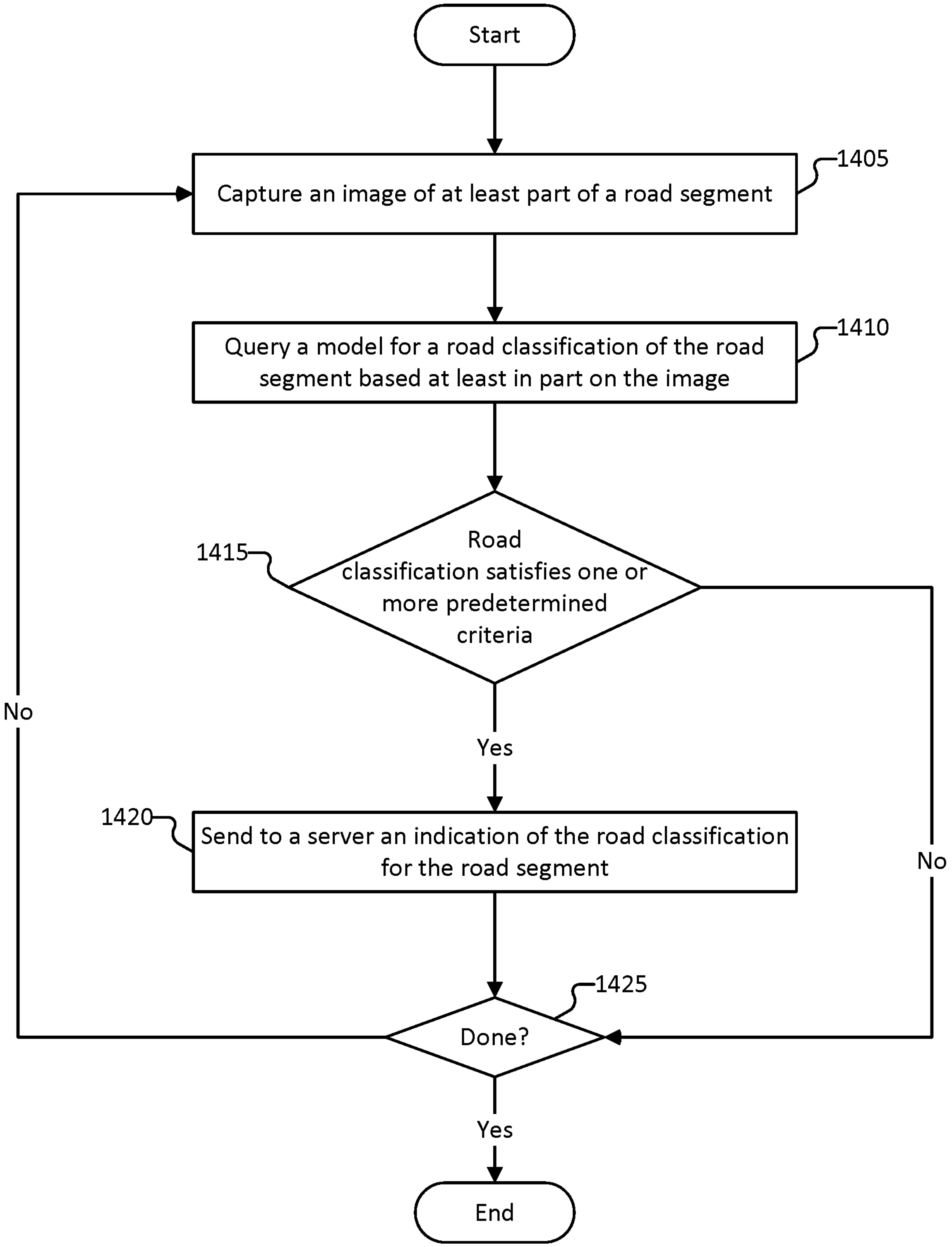
FIG. 14 is a flow diagram of a method for determining a road condition for a road segment at a client system according to various embodiments of the present application.

FIG. 14 is a flow diagram of a method for determining a road condition for a road segment at a client system according to various embodiments of the present application. In some embodiments, process 1400 is implemented at least in part by system 100 of FIG. 1 and/or system 200 of FIG. 2. In some embodiments, process 1400 is implemented locally at a vehicle, such as by a client system comprised in the vehicle.

At 1405, the system captures an image of at least part of a road segment. At 1410, the system queries a model for a road classification of the road segment based at least in part on the image. At 1415, the system determines whether the road classification satisfies one or more predetermined criteria. As an example, the one or more predefined criteria is that the road condition classification for a road segment is the road segment having a non-clear road condition. Various other predefined criteria may be implemented, such as criteria requiring that the road condition be a certain higher risk type before triggering the vehicle to send the road condition classification to the server. In response to determining that the road classification satisfies the one or more predetermined criteria, process 1400 proceeds to 1420. Conversely, in response to determining that the road classification does not satisfy the one or more predetermined criteria, process 1400 proceeds to 1425. At 1420, the system sends to a server an indication of the road classification for the road segment. At 1425, a determination is made as to whether process 1400 is complete. In some embodiments, process 1400 is determined to be complete in response to a determination that no further images are to be processed, no further images are obtained, no further road classifications are to be determined for a road segment, a user indicates that process 1400 is to be paused or stopped, etc. In response to a determination that process 1400 is complete, process 1400 ends. In response to a determination that process 1400 is not complete, process 1400 returns to 1405.

Figure 15:
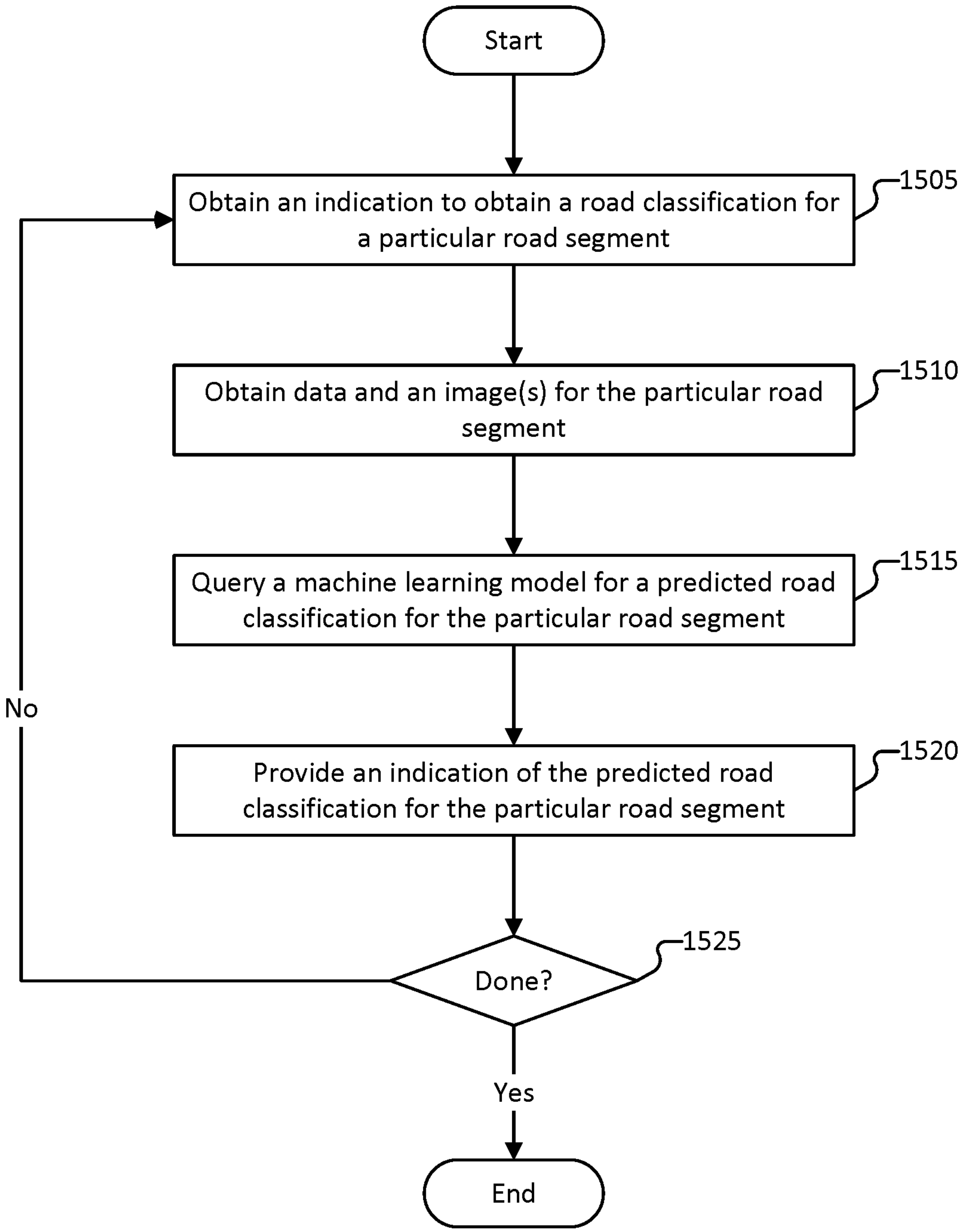
FIG. 15 is a flow diagram of a method for obtaining a predicted road classification based at least in part on a machine learning model according to various embodiments of the present application.

FIG. 15 is a flow diagram of a method for obtaining a predicted road classification based at least in part on a machine learning model according to various embodiments of the present application. In some embodiments, process 1500 is implemented at least in part by system 100 of FIG. 1 and/or system 200 of FIG. 2.

At 1505, the system obtains an indication to obtain a road classification for a particular road segment. At 1510, the system obtains data and an image(s) for the particular road segment. At 1515, the system queries a machine learning model for a predicted road classification for the particular road segment. At 1520, the system provides an indication of the predicted road classification for the particular road segment. At 1525, a determination is made as to whether process 1500 is complete. In some embodiments, process 1500 is determined to be complete in response to a determination that no further images are to be processed, no further images are obtained, no further road classifications are to be determined for a road segment, a user indicates that process 1500 is to be paused or stopped, etc. In response to a determination that process 1500 is complete, process 1500 ends. In response to a determination that process 1500 is not complete, process 1500 returns to 1505.

Figure 16:
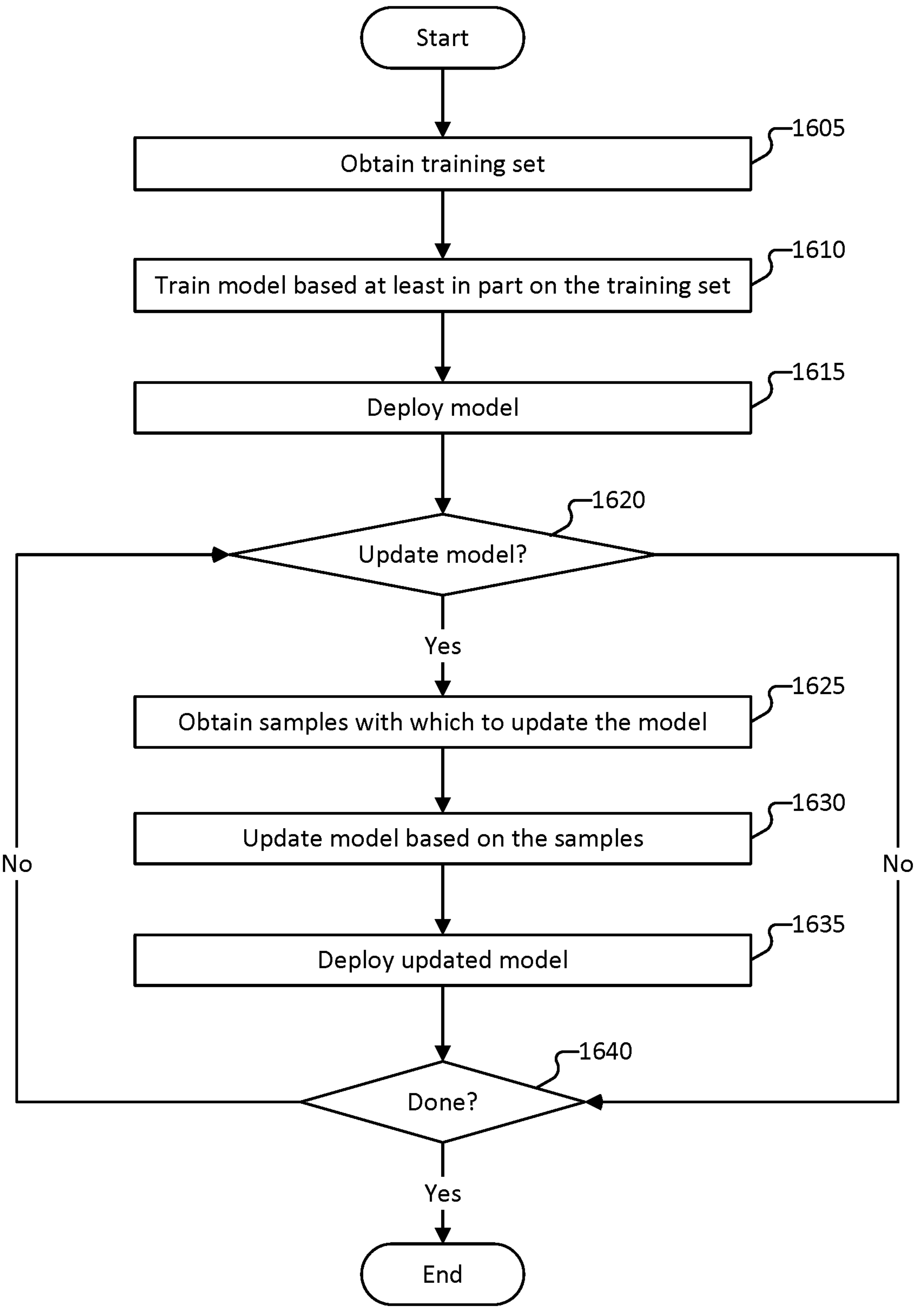
FIG. 16 is a flow diagram of managing a model used in connection with driving guidance according to various embodiments of the present application.

FIG. 16 is a flow diagram of managing a model used in connection with driving guidance according to various embodiments of the present application. In some embodiments, process 1600 is implemented at least in part by system 100 of FIG. 1 and/or system 200 of FIG. 2.

At 1605, a training set is obtained. The training set may comprise labeled data corresponding to known/previous road condition classifications for a set of images. At 1610, a model is trained based at least in part on the training set. At 1615, the model is deployed. At 1620, the system determines whether to update the model. For example, the system identifies gaps in the model and determines to update the model based on training against a training set of samples associated with the gaps (e.g., a training set of a particular driving context(s)). In response to determining that the model is not to be updated at 1620, process 1600 proceeds to 1640. In response to determining that the model is to be updated at 1620, process 1600 proceeds to 1625 at which samples with which the model is to be updated are obtained. At 1630, the model is updated based at least in part on the samples. At 1635, the updated model is deployed. At 1640, a determination is made as to whether process 1600 is complete. In some embodiments, process 1600 is determined to be complete in response to a determination that no further samples are to be obtained, no further updates are to be performed with respect to a model(s), a user indicates that process 1600 is to be paused or stopped, etc. In response to a determination that process 1600 is complete, process 1600 ends. In response to a determination that process 1600 is not complete, process 1600 returns to 1620.

Figure 17:
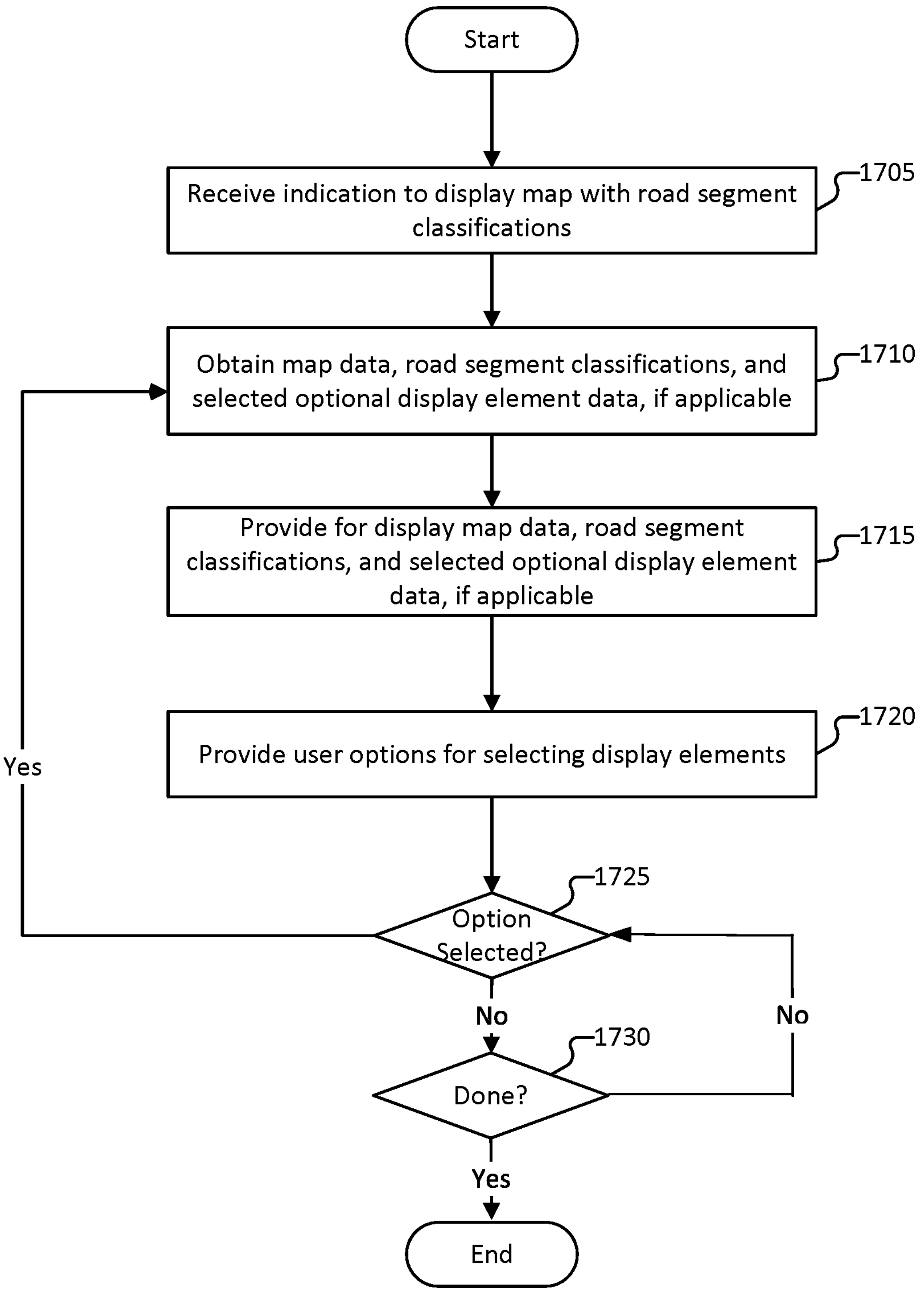
FIG. 17 is a flow diagram of a method for providing display of road segment classifications.

FIG. 17 is a flow diagram of a method for providing display of road segment classifications. In some embodiments, process 1700 is implemented at least in part by system 100 of FIG. 1 and/or system 200 of FIG. 2.

At 1705, an indication is received to display a map with road segment classifications. For example, the system receives a request to display a map of geographical area with road classifications (e.g., weather or road conditions) shown.

At 1710, map data, road segment classifications, and selected optional display element data, if applicable, are obtained. For example, the map data, road segment classifications, and any selected optional display element data for a geographical area are retrieved from a database for display in a user interface.

At 1715, map data, road segment classifications, and selected optional display element data, if applicable, are provided for display. For example, the map data, road segment classifications, and any selected optional display element data for a geographical area are provided for display in a user interface to a user system.

At 1720, user options are provided for selecting display elements. For example, a user interface is provided with elements for display that enable selection of additional information and the elements are displayed to a user by the user system.

At 1725, it is determined whether there are any options selected. For example, it is determined whether a user selection displayed has been selected by the user. In response to determining that an option was selected, control passes to 1710. In response to determining that an option was not selected, control passes to 1730.

At 1730, it is determined whether the process is done. For example, it is determined whether the user interface is desired to be terminated by a user (e.g., an exit command has been received, a close window command has been received, etc.). In response to determining that the process is done, the process ends. In response to determining that the process is not done, control passes to 1725.

Figure 18:
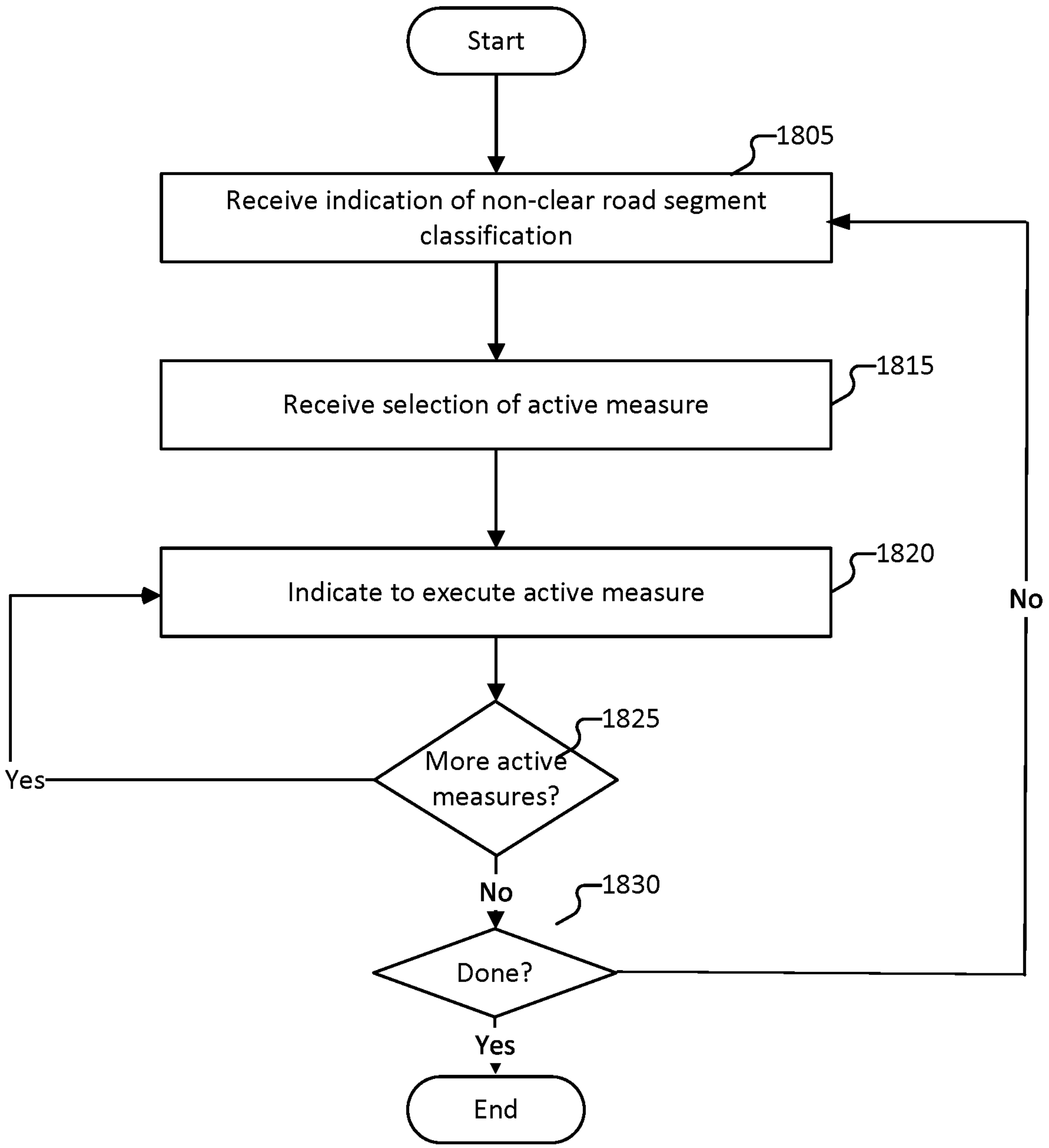
FIG. 18 is a flow diagram of a method for determining and indicating to execute an active measure.

FIG. 18 is a flow diagram of a method for determining and indicating to execute an active measure. In some embodiments, process 1800 is implemented at least in part by system 100 of FIG. 1 and/or system 200 of FIG. 2.

At 1805, an indication of non-clear road segment classification is received. to display a map with road segment classification. For example, the system receives an indication from an analyzer that a road segment is not clear (e.g., from a road condition identification module).

At 1815, selection of an active measure is received. For example, either a user or an active measure module provides a selection of an active measure. In the case of a user providing the selection, the user is provided with the information of a non-clear road segment, and options for active measures and the user selection is provided. In the case of the active measure module providing the selection, the active measure module receives an indication of the non-clear road segment, and the active measure module selects an active measure. For example, active measures that can be selected include alerting the driver or fleet manager (e.g., sending a prompt to a client system), re-routing the driver (e.g., updating a planned route), updating a map or visualization of a geographic area (e.g., updating a particular routing map for a driver, a map used by a dispatcher to monitor the status of a fleet of vehicles, etc.), updating an estimated time of arrival, sending an alert to a government (e.g., informing governments on where to send resources, such as snow plows, cleanup crews, or first responders), sending a notification to a vehicle management system, sending a notification to a vehicle event recorder, etc. In some embodiments, an active measure comprises indicating to a vehicle management system (e.g., an ADAS)—for example, parameters associated with ADAS algorithms implemented on a vehicle event recorder may be changed (e.g., following distance, speed, etc. are updated). Various other active measures may be implemented. The re-routing of the driver may be implemented to avoid sending vehicles down dangerous snowy roads, route a vehicle around bad weather, a road closure, or traffic, or improve travel efficiency for the vehicle. The alert provided to the driver can be used to adjust a behavior, such as to inform the driver that a following distance trigger should be longer when the vehicle is travelling over road segments subject to rain or snow, to inform the driver or vehicle that a speed threshold (e.g., a speeding threshold that triggers an alert to the driver at the vehicle client system) is adjusted down over road segments subject to rain or snow, or to suggest safe speeds for a particular vehicle type based on a particular road condition or weather condition type on road segments.

At 1820, it is indicated to execute the active measure. For example, the selected active measure is indicated to be executed and executed by the system.

At 1825, it is determined whether there are any other selected active measures. For example, it is determined whether there are more active measures. In response to determining that there are more active measures, control passes to 1820. In response to determining that there are not more active measures, control passes to 1830.

At 1830, it is determined whether the process is done. For example, it is determined whether the user interface is desired to be terminated by a user (e.g., an exit command has been received, a close window command has been received, etc.). In some embodiments, is done automatically and not attached to a user interface—for example, the system notifies drivers when there is bad weather near them. This automated system runs either on a schedule or when new data enters the system and is not tied to a UI. In response to determining that the process is done, the process ends. In response to determining that the process is not done, control passes to 1805.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:

a memory; and one or more processors configured to:

determine a set of one or more images for a particular geographic area;

obtain the set of one or more images for the particular geographic area;

determine a set of road classifications for a set of road segments associated with the particular geographic area that are based at least in part on querying a machine learning model to classify the set of one or more images, wherein determining the set of road classifications for the set of road segments comprises:

determining a road classification for a particular road segment based on a plurality of images associated with the particular road segment, wherein determining the road classification for the particular road segment comprises aggregating predicted road classifications from the plurality of images using a hierarchical structure of road segments, wherein child road segments are aggregated into a parent road segment based on a most severe road condition among the child road segments; and store the set of road classifications in association with the set of road segments.

2. The system of claim 1, wherein the one or more processors is further configured to target particular geographic areas based on data indicating those areas are at potential risk.

3. The system of claim 1, wherein the one or more processors is further configured to:

receive an image associated with a geographic area; and determine whether there is a risk associated with the geographic area.

4. The system of claim 1, wherein the set of one or more images are current images or images captured within a predefined time period.

5. The system of claim 1, wherein the road classification for the particular road segment corresponds to a predicted road classification for a majority of images for the particular road segment.

6. The system of claim 1, wherein the road classification for the particular road segment corresponds to an average of a set of predicted road classifications.

7. The system of claim 1, wherein the set of one or more images are obtained from one or more vehicles having a location matching the set of road segments.

8. The system of claim 1, wherein the set of road classifications is an indication of a road condition.

9. The system of claim 8, wherein the road condition includes one or more of: (i) a clear road, (ii) a presence of snow, presence of ice, (iii) a wet surface, a flooded road, (iv) amount of precipitation accumulation, (v) low visibility, (vi) a crash, (vii) traffic, (viii) construction, a lane closure ( ) road closure, (ix) a fire on or near the road, (x) the presence of emergency response vehicles such as police cars, fire trucks, and ambulances, (xi) objects on the road such as tires, automobile parts, or fallen cargo, oil slicks, (xii) an animal on the road, (xiii) a pedestrian on the road, (xiv) a cyclist on the road, pavement conditions such as rough, smooth, dirt, or gravel road, potholes, (xxiii) lighting conditions such as darkness or glare from the sun, and (xxv) posted speed limits including variable limits.

10. The system of claim 1, wherein the one or more processors are further configured to:

capture an image of at least part of a particular road segment;

query a classifier for a road classification of the particular road segment based at least in part on the image;

determine whether the road classification satisfies one or more predefined criteria; and in response to determining that the road classification satisfies the one or more predefined criteria, send to a server an indication of the road classification for the particular road segment.

11. The system of one or more of claim 10, wherein the one or more predefined criteria includes a match between the road classification and one or more interesting road classifications.

12. The system of claim 11, wherein the one or more interesting road classifications correspond to road conditions that are deemed to have elevated risk to a vehicle.

13. The system of claim 10, wherein in response to receiving the indication of the road classification for the particular road segment, the server stores the road classification in a geospatial database.

14. The system of claim 13, wherein the indication of the road classification for the particular road segment comprises (i) the road classification, and (ii) a current location of a vehicle from which the image is captured or a location at which the image was captured.

15. The system of claim 13, wherein the indication of the road classification for the particular road segment comprises (i) the road classification, (ii) a current location of a vehicle from which the image is captured or a location at which the image was captured, and (iii) a date, time, and/or time zone associated with the image.

16. The system of claim 1, wherein the set of road classifications is determined based at least in part on obtaining vehicle data from one or more vehicles, the vehicle data comprising a current location of a vehicle and an indication of a road classification for the current location.

17. The system of claim 1, wherein the one or more processors are further configured to:

obtain, from the set of road classifications, a particular road classification for a particular road segment;

determine that the particular road classification satisfies a predefined criteria; and in response to determining that the particular road classification satisfies the predefined criteria, perform an active measure.

18. The system of claim 17, wherein performing the active measure includes one or more of:

(i) rerouting one or more vehicles that are (a) expected to pass through the particular road segment within a predetermined period of time, or (b) within a predefined vicinity of the particular road segment within the predetermined period of time;

(ii) sending an alert to a vehicle that is (x) expected to pass through the particular road segment within the predetermined period of time, or (y) within the predefined vicinity of the particular road segment within the predetermined period of time;

(iii) providing the alert to a user interface to be displayed at a client system; and (iv) adjusting an ADAS parameter.

19. The system of claim 1, wherein determining the set of road classifications for the set of road segments comprises:

determining an aggregate road classification for a particular road segment based at least in part on a plurality of indications of the aggregate road classification for the particular road segment comprised in vehicle data obtained from a plurality of vehicles on, or having recently travelled on, the particular road segment.

20. The system of claim 1, wherein a processor of the one or more processors comprises a vehicle data server processor.

21. The system of claim 1, wherein a processor of the one or more processors comprises a vehicle event recorder processor.

22. A method, comprising:

determining, using a processor, a set of one or more images for a particular geographic area;

obtaining the set of one or more images for the particular geographic area;

determining a set of road classifications for a set of road segments associated with the particular geographic area that are based at least in part on querying a machine learning model to classify the set of one or more images, wherein determining the set of road classifications for the set of road segments comprises:

determining a road classification for a particular road segment based on a plurality of images associated with the particular road segment, wherein determining the road classification for the particular road segment comprises aggregating predicted road classifications from the plurality of images using a hierarchical structure of road segments, wherein child road segments are aggregated into a parent road segment based on a most severe road condition among the child road segments; and storing the set of road classifications in association with the set of road segments.

23. A computer program product embodied in a non-transitory computer readable medium and comprising computer instructions for:

determining, using a processor, a set of one or more images for a particular geographic area;

obtaining a set of one or more images for the particular geographic area;

determining a set of road classifications for a set of road segments associated with the particular geographic area that are based at least in part on querying a machine learning model to classify the set of one or more images, wherein determining the set of road classifications for the set of road segments comprises:

determining a road classification for a particular road segment based on a plurality of images associated with the particular road segment, wherein determining the road classification for the particular road segment comprises aggregating predicted road classifications from the plurality of images using a hierarchical structure of road segments, wherein child road segments are aggregated into a parent road segment based on a most severe road condition among the child road segments; and storing the set of road classifications in association with the set of road segments.

24. The system of claim 2, wherein the potential risk is a potential weather-related risk including one or more of precipitation, snow, ice, or fog, for the particular geographic area.

25. The system of claim 10, wherein:

the one or more predefined criteria comprises the road classification indicating an elevated weather-related risk to the vehicle;

the elevated weather-related risk includes one or more of snow, ice, and flooding; and the machine learning model deployed at a vehicle-side client system is a lighter model trained on fewer features than a server-side machine learning model used to perform classifications with greater latency than the vehicle-side machine learning model.

* * * * *